US011496858B2

(12) United States Patent
Balasubramanian et al.

(10) Patent No.: US 11,496,858 B2
(45) Date of Patent: Nov. 8, 2022

(54) COOPERATIVE EVENT WARNING SYSTEM

(71) Applicant: QUALCOMM Incorporated, San Diego, CA (US)

(72) Inventors: Anantharaman Balasubramanian, San Diego, CA (US); Kapil Gulati, Belle Mead, NJ (US); Sudhir Kumar Baghel, Hillsborough, NJ (US); Taesang Yoo, San Diego, CA (US); Shailesh Patil, San Diego, CA (US); Dan Vassilovski, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/160,267

(22) Filed: Jan. 27, 2021

(65) Prior Publication Data

US 2021/0243556 A1    Aug. 5, 2021

Related U.S. Application Data

(60) Provisional application No. 62/968,561, filed on Jan. 31, 2020.

(51) Int. Cl.
*H04W 4/02* (2018.01)
*G01S 5/00* (2006.01)
(Continued)

(52) U.S. Cl.
CPC .......... *H04W 4/023* (2013.01); *G01S 5/0072* (2013.01); *H04W 4/025* (2013.01); *H04W 4/90* (2018.02); *H04W 64/006* (2013.01)

(58) Field of Classification Search
CPC .......... H04W 4/44; H04W 4/46; H04W 4/02; H04W 4/024; H04W 36/32; H04W 4/026;
(Continued)

(56) References Cited

U.S. PATENT DOCUMENTS 11,097,724 B2 *   8/2021   Maeda .................. B60W 10/20
2013/0293394 A1   11/2013   Rubin et al.
(Continued)

FOREIGN PATENT DOCUMENTS

CN          107067706 A     8/2017
WO       WO-2020263873     12/2020

OTHER PUBLICATIONS

International Search Report and Written Opinion—PCT/US2021/015490—ISA/EPO—dated Jun. 24, 2021.
(Continued)

*Primary Examiner* — Kwasi Karikari
(74) *Attorney, Agent, or Firm* — Holland & Hart LLP/QUALCOMM Incorporated

(57) ABSTRACT

Methods, systems, and devices for wireless communications are described. A first wireless device may receive situational information for a second wireless device over a first communication link between the first wireless device and the second wireless device and situational information for a third wireless device over a second communication link between the first wireless device and the third wireless device. The first wireless device may transmit message with guidance information to the second wireless device on behalf of the third wireless device and based on the second wireless device and the third wireless device having an event likelihood above a threshold. The event likelihood may be based on the situational information for the second wireless device and the situational information for the third wireless device.

58 Claims, 16 Drawing Sheets

(51) Int. Cl.
*H04W 64/00* (2009.01)
*H04W 4/90* (2018.01)

(58) Field of Classification Search
CPC ... H04W 4/027; H04W 4/48; H04W 72/1278; H04W 76/40; H04W 84/005
See application file for complete search history.

(56) References Cited

U.S. PATENT DOCUMENTS

| | | |
|---|---|---|
| 2013/0325306 A1* | 12/2013 | Caveney ................ G08G 1/166 701/117 |
| 2016/0343256 A1 | 11/2016 | Song et al. |
| 2018/0090005 A1 | 3/2018 | Philosof et al. |
| 2018/0295474 A1 | 10/2018 | Lee et al. |
| 2019/0045437 A1 | 2/2019 | Krishnamoorthy et al. |
| 2019/0088133 A1* | 3/2019 | Alieiev ................ G08G 1/091 |
| 2019/0256088 A1* | 8/2019 | Sharma ................ B60W 50/14 |

OTHER PUBLICATIONS

Partial International Search Report—PCT/US2021/015490—ISA/EPO—dated Apr. 21, 2021.

* cited by examiner

COOPERATIVE EVENT WARNING SYSTEM

CROSS REFERENCE

The present Application for Patent claims the benefit of U.S. Provisional patent Application No. 62/968,561 by BALASUBRAIVIANIAN et al., entitled "COOPERATIVE COLLISION WARNING SYSTEM," filed Jan. 31, 2020, assigned to the assignee hereof, and expressly incorporated by reference herein.

INTRODUCTION

The following relates to wireless communications, and more specifically to managing warnings relating to events.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

A method for wireless communication is described. The method may include receiving, at a first wireless device, situational information for a second wireless device over a first communication link between the first wireless device and the second wireless device and situational information for a third wireless device over a second communication link between the first wireless device and the third wireless device. The method may include transmitting a message including guidance information to the second wireless device on behalf of the third wireless device and based on the second wireless device and the third wireless device having an event likelihood above a threshold, where the event likelihood is based on the situational information for the second wireless device and the situational information for the third wireless device.

An apparatus for wireless communication is described. The apparatus may include a processor and memory coupled to the processor. The processor and memory may be configured to receive, at a first wireless device, situational information for a second wireless device over a first communication link between the first wireless device and the second wireless device and situational information for a third wireless device over a second communication link between the first wireless device and the third wireless device. The processor and memory may be configured to transmit a message including guidance information to the second wireless device on behalf of the third wireless device and based on the second wireless device and the third wireless device having an event likelihood above a threshold, where the event likelihood is based on the situational information for the second wireless device and the situational information for the third wireless device.

Another apparatus for wireless communication is described. The apparatus may include means for receiving, at a first wireless device, situational information for a second wireless device over a first communication link between the first wireless device and the second wireless device and situational information for a third wireless device over a second communication link between the first wireless device and the third wireless device. The apparatus may include means for transmitting a message including guidance information to the second wireless device on behalf of the third wireless device and based on the second wireless device and the third wireless device having an event likelihood above a threshold, where the event likelihood is based on the situational information for the second wireless device and the situational information for the third wireless device.

A non-transitory computer-readable medium storing code for wireless communication is described. The code may include instructions executable by a processor to receive, at a first wireless device, situational information for a second wireless device over a first communication link between the first wireless device and the second wireless device and situational information for a third wireless device over a second communication link between the first wireless device and the third wireless device. The code may include instructions executable by a processor to transmit a message including guidance information to the second wireless device on behalf of the third wireless device and based on the second wireless device and the third wireless device having an event likelihood above a threshold, where the event likelihood is based on the situational information for the second wireless device and the situational information for the third wireless device.

In some examples of the method, apparatuses, and non-transitory computer-readable medium described herein, the situational information indicates a yaw, a pitch, a roll angle, a position, a velocity, a direction, a change in yaw, a change in roll angle, a change in position, a change in velocity, a change in direction, a change in acceleration or a combination thereof.

In some examples of the method, apparatuses, and non-transitory computer-readable medium described herein, the event likelihood includes an impact likelihood.

In some examples of the method, apparatuses, and non-transitory computer-readable medium described herein, the guidance information includes an indication of a possible impact, an indication of an action to avoid a possible impact, or a combination thereof.

Some examples of the method, apparatuses, and non-transitory computer-readable medium described herein may further include operations, features, means, or instructions for determining a direction for the second wireless device to avoid for a duration of time, where the guidance information includes an indication of the direction and the duration of time, determining an adjustment to a velocity of the second wireless device, where the guidance information includes an indication of the adjustment. Some examples of the method, apparatuses, and non-transitory computer-readable medium described herein may further include operations, features, means, or instructions for determining an adjustment to a heading angle of the second wireless device, where the guidance information includes an indication of the adjustment.

Some examples of the method, apparatuses, and non-transitory computer-readable medium described herein may further include operations, features, means, or instructions for determining a route for the second wireless device to take to prevent a collision with the third wireless device based on the situational information for the second and third wireless devices, where the guidance information includes an indication of the route.

Some examples of the method, apparatuses, and non-transitory computer-readable medium described herein may further include operations, features, means, or instructions for determining a route of the third wireless device based on the situational information for the third wireless device, where the guidance information includes an indication of the route.

Some examples of the method, apparatuses, and non-transitory computer-readable medium described herein may further include operations, features, means, or instructions for transmitting a second message including guidance information to the third wireless device based on determining that the second wireless device and the third wireless device may have an event likelihood above the threshold.

Some examples of the method, apparatuses, and non-transitory computer-readable medium described herein may further include operations, features, means, or instructions for receiving from the second wireless device an indication of a period of time the second wireless device may be able to receive communications and transmitting the guidance information to the second wireless device during the period of time.

Some examples of the method, apparatuses, and non-transitory computer-readable medium described herein may further include operations, features, means, or instructions for determining that the second wireless device may be unaware of the third wireless device, where the guidance information may be transmitted based on determining that the second wireless device may be unaware of the third wireless device.

Some examples of the method, apparatuses, and non-transitory computer-readable medium described herein may further include operations, features, means, or instructions for determining that the first wireless device may be on an impact-free course with respect to the second wireless device, where the guidance information may be transmitted after determining that the first wireless device may be on the impact-free course.

In some examples of the method, apparatuses, and non-transitory computer-readable medium described herein, the first wireless device and the second wireless device may be moving asynchronously or may have a difference in velocity greater than a threshold velocity.

A method for wireless communication is described. The method may include transmitting, by a first wireless device, situational information for the first wireless device to a second wireless device over a communication link between the first wireless device and the second wireless device. The method may include receiving, from the second wireless device over the communication link, a message including guidance information that indicates the first wireless device and a third wireless device have an event likelihood above a threshold. The method may include outputting a signal to prompt a change in behavior based on the guidance information.

An apparatus for wireless communication is described. The apparatus may include a processor and memory coupled to the processor. The processor and memory may be configured to transmit, by a first wireless device, situational information for the first wireless device to a second wireless device over a communication link between the first wireless device and the second wireless device. The processor and memory may be configured to receive, from the second wireless device over the communication link, a message including guidance information that indicates the first wireless device and a third wireless device have an event likelihood above a threshold. The processor and memory may be configured to output a signal to prompt a change in behavior based on the guidance information.

Another apparatus for wireless communication is described. The apparatus may include means for transmitting, by a first wireless device, situational information for the first wireless device to a second wireless device over a communication link between the first wireless device and the second wireless device. The apparatus may include means for receiving, from the second wireless device over the communication link, a message including guidance information that indicates the first wireless device and a third wireless device have an event likelihood above a threshold. The apparatus may include means for outputting a signal to prompt a change in behavior based on the guidance information.

A non-transitory computer-readable medium storing code for wireless communication is described. The code may include instructions executable by a processor to transmit, by a first wireless device, situational information for the first wireless device to a second wireless device over a communication link between the first wireless device and the second wireless device. The code may include instructions executable by a processor to receive, from the second wireless device over the communication link, a message including guidance information that indicates the first wireless device and a third wireless device have an event likelihood above a threshold. The code may include instructions executable by a processor to output a signal to prompt a change in behavior based on the guidance information.

In some examples of the method, apparatuses, and non-transitory computer-readable medium described herein, the situational information indicates position, velocity, direction, or a combination thereof.

In some examples of the method, apparatuses, and non-transitory computer-readable medium described herein, the change in behavior includes a change in yaw, a change in pitch, a change in roll angle, a change in velocity, a change in direction, a change in acceleration, outputting an alert signal, or a combination thereof.

In some examples of the method, apparatuses, and non-transitory computer-readable medium described herein, the signal may be communicated to a vehicle coupled with the first wireless device, a person coupled with the first wireless device, the second wireless device, the third wireless device, or a combination thereof, and the change in behavior includes a change by the vehicle coupled with the first wireless device, a change by the person coupled with the first wireless device, a change by the second wireless device, a change by the third wireless device, or a combination thereof.

In some examples of the method, apparatuses, and non-transitory computer-readable medium described herein, the guidance information includes a direction for the first wireless device to avoid for a duration of time, an adjustment to a heading angle of the second wireless device, an adjustment to a velocity of the second wireless device, situational information for the third wireless device, or a combination thereof.

In some examples of the method, apparatuses, and non-transitory computer-readable medium described herein, the signal includes a visual, auditory, or tactile signal detectable by a human or an electrical signal detectable by an electronic device.

Some examples of the method, apparatuses, and non-transitory computer-readable medium described herein may further include operations, features, means, or instructions for determining that a fourth wireless device within a threshold distance of the first wireless device may be traveling in a same direction or to a same destination as the first wireless device and transmitting the guidance information to the fourth wireless device.

In some examples of the method, apparatuses, and non-transitory computer-readable medium described herein, the guidance information may be received while the first wireless device may be out of communication range with the third wireless device and the method, apparatuses, and non-transitory computer-readable medium may include further operations, features, means, or instructions for determining that the first wireless device may be in communication range of the third wireless device, where communicating with the third wireless device may be based on determining that the first wireless device may be in communication range of the third wireless device.

A method for wireless communication is described. The method may include receiving, at a first wireless device, situational information for a second wireless device from a third wireless device. The method may include transmitting a message including guidance information to the second wireless device based on the first wireless device and the second wireless device having an event likelihood above a threshold, where the event likelihood is based on a route of the second wireless device, and where the route of the second wireless device is based on the situational information for the second wireless device.

An apparatus for wireless communication is described. The apparatus may include a processor and memory coupled to the processor. The processor and memory may be configured to receive, at a first wireless device, situational information for a second wireless device from a third wireless device. The processor and memory may be configured to transmit a message including guidance information to the second wireless device based on the first wireless device and the second wireless device having an event likelihood above a threshold, where the event likelihood is based on a route of the second wireless device, and where the route of the second wireless device is based on the situational information for the second wireless device.

Another apparatus for wireless communication is described. The apparatus may include means for receiving, at a first wireless device, situational information for a second wireless device from a third wireless device. The apparatus may include means for transmitting a message including guidance information to the second wireless device based on the first wireless device and the second wireless device having an event likelihood above a threshold, where the event likelihood is based on a route of the second wireless device, and where the route of the second wireless device is based on the situational information for the second wireless device.

A non-transitory computer-readable medium storing code for wireless communication is described. The code may include instructions executable by a processor to receive, at a first wireless device, situational information for a second wireless device from a third wireless device. The code may include instructions executable by a processor to transmit a message including guidance information to the second wireless device based on the first wireless device and the second wireless device having an event likelihood above a threshold, where the event likelihood is based on a route of the second wireless device, and where the route of the second wireless device is based on the situational information for the second wireless device.

Some examples of the method, apparatuses, and non-transitory computer-readable medium described herein may further include operations, features, means, or instructions for determining additional situational information for the second wireless device based on information from one or more sensors coupled with the first wireless device, where the event likelihood may be determined based on the additional situational information for the second wireless device.

Some examples of the method, apparatuses, and non-transitory computer-readable medium described herein may further include operations, features, means, or instructions for transmitting the additional situational information for the second wireless device to the third wireless device, where the route of the second wireless device may be determined cooperatively with the third wireless device.

Some examples of the method, apparatuses, and non-transitory computer-readable medium described herein may further include operations, features, means, or instructions for receiving additional situational information for the second wireless device from the second wireless device, where route of the second wireless device may be determined based on the additional situational information for the second wireless device.

In some examples of the method, apparatuses, and non-transitory computer-readable medium described herein, the situational information includes a location of the second wireless device within an image frame, one or more coordinates of the second wireless device, a heading angle of the second wireless device, a body position of a user of the second wireless device, or a combination thereof.

A method for wireless communication is described. The method may include receiving, at a first wireless device, surroundings information from a second wireless device over a link between the first wireless device and the second wireless device. The method may include transmitting a message including guidance information to a third wireless device based on the third wireless device having an event likelihood above a threshold, where the event likelihood is based on the surroundings information from the second wireless device.

An apparatus for wireless communication is described. The apparatus may include a processor and memory coupled to the processor. The processor and memory may be configured to receive, at a first wireless device, surroundings information from a second wireless device over a link between the first wireless device and the second wireless device. The processor and memory may be configured to transmit a message including guidance information to a third wireless device based on the third wireless device having an event likelihood above a threshold, where the event likelihood is based on the surroundings information from the second wireless device.

Another apparatus for wireless communication is described. The apparatus may include means for receiving, at a first wireless device, surroundings information from a second wireless device over a link between the first wireless device and the second wireless device. The apparatus may include means for transmitting a message including guidance information to a third wireless device based on the third wireless device having an event likelihood above a threshold, where the event likelihood is based on the surroundings information from the second wireless device.

A non-transitory computer-readable medium storing code for wireless communication is described. The code may include instructions executable by a processor to receive, at a first wireless device, surroundings information from a second wireless device over a link between the first wireless device and the second wireless device. The code may include instructions executable by a processor to transmit a message including guidance information to a third wireless device based on the third wireless device having an event likelihood above a threshold, where the event likelihood is based on the surroundings information from the second wireless device.

In some examples of the method, apparatuses, and non-transitory computer-readable medium described herein, the surroundings information indicates an object, a road condition, or a combination thereof.

In some examples of the method, apparatuses, and non-transitory computer-readable medium described herein, the event likelihood includes a likelihood that the second wireless device passes within a threshold distance of an object or road condition.

In some examples of the method, apparatuses, and non-transitory computer-readable medium described herein, the guidance information indicates a location of an object, a location of a road condition, or a combination thereof.

In some examples of the method, apparatuses, and non-transitory computer-readable medium described herein, the guidance information indicates one or more actions the second wireless device can take to reduce the event likelihood.

A method for wireless communication is described. The method may include receiving, at a first wireless device, situational information for a second wireless device over a first communication link between the first wireless device and the second wireless device, where the situational information indicates position, velocity, direction, or a combination thereof. The method may include receiving, at the first wireless device, situational information for a third wireless device over a second communication link between the first wireless device and the third wireless device. The method may include determining that the second wireless device and the third wireless device have a collision likelihood above a threshold based on the situational information for the second and third wireless devices. The method may include transmitting a message including collision avoidance information to the second wireless device on behalf of the third wireless device and based on determining that the second wireless and the third wireless device have a collision likelihood above the threshold.

An apparatus for wireless communication is described. The apparatus may include a processor and memory coupled to the processor. The processor and memory may be configured to receive, at a first wireless device, situational information for a second wireless device over a first communication link between the first wireless device and the second wireless device, where the situational information indicates position, velocity, direction, or a combination thereof. The processor and memory may be configured to receive, at the first wireless device, situational information for a third wireless device over a second communication link between the first wireless device and the third wireless device. The processor and memory may be configured to determine that the second wireless device and the third wireless device have a collision likelihood above a threshold based on the situational information for the second and third wireless devices. The processor and memory may be configured to transmit a message including collision avoidance information to the second wireless device on behalf of the third wireless device and based on determining that the second wireless and the third wireless device have a collision likelihood above the threshold.

Another apparatus for wireless communication is described. The apparatus may include means for receiving, at a first wireless device, situational information for a second wireless device over a first communication link between the first wireless device and the second wireless device, where the situational information indicates position, velocity, direction, or a combination thereof. The apparatus may include means for receiving, at the first wireless device, situational information for a third wireless device over a second communication link between the first wireless device and the third wireless device. The apparatus may include means for determining that the second wireless device and the third wireless device have a collision likelihood above a threshold based on the situational information for the second and third wireless devices. The apparatus may include means for transmitting a message including collision avoidance information to the second wireless device on behalf of the third wireless device and based on determining that the second wireless and the third wireless device have a collision likelihood above the threshold.

A non-transitory computer-readable medium storing code for wireless communication is described. The code may include instructions executable by a processor to receive, at a first wireless device, situational information for a second wireless device over a first communication link between the first wireless device and the second wireless device, where the situational information indicates position, velocity, direction, or a combination thereof. The code may include instructions executable by a processor to receive, at the first wireless device, situational information for a third wireless device over a second communication link between the first wireless device and the third wireless device. The code may include instructions executable by a processor to determine that the second wireless device and the third wireless device have a collision likelihood above a threshold based on the situational information for the second and third wireless devices. The code may include instructions executable by a processor to transmit a message including collision avoidance information to the second wireless device on behalf of the third wireless device and based on determining that the second wireless device and the third wireless device have a collision likelihood above the threshold.

Some examples of the method, apparatuses, and non-transitory computer-readable medium described herein may further include operations, features, means, or instructions for determining a behavior associated with position, velocity, direction, or a combination thereof that will prevent collision between the second and third wireless devices, where the collision avoidance information includes an indication of the behavior.

In some examples of the method, apparatuses, and non-transitory computer-readable medium described herein, determining the behavior may include operations, features, means, or instructions for determining a direction for the second wireless device to avoid for a duration of time, where the collision avoidance information includes an indication of the direction and the duration of time.

In some examples of the method, apparatuses, and non-transitory computer-readable medium described herein, determining the behavior may include operations, features, means, or instructions for determining an adjustment to a velocity of the second wireless device, where the collision avoidance information includes an indication of the adjustment.

In some examples of the method, apparatuses, and non-transitory computer-readable medium described herein, determining the behavior may include operations, features, means, or instructions for determining an adjustment to a heading angle of the second wireless device, where the collision avoidance information includes an indication of the adjustment.

Some examples of the method, apparatuses, and non-transitory computer-readable medium described herein may further include operations, features, means, or instructions for transmitting an indication of the behavior to the third wireless device.

Some examples of the method, apparatuses, and non-transitory computer-readable medium described herein may further include operations, features, means, or instructions for determining a route for the second wireless device to take to prevent a collision with the third wireless device based on the situational information for the second and third wireless devices, where the collision avoidance information includes an indication of the route.

Some examples of the method, apparatuses, and non-transitory computer-readable medium described herein may further include operations, features, means, or instructions for determining a route of the third wireless device based on the situational information for the third wireless device, where the collision avoidance information includes an indication of the route.

Some examples of the method, apparatuses, and non-transitory computer-readable medium described herein may further include operations, features, means, or instructions for determining a period of time during which the collision avoidance information may be applicable, where the collision avoidance information includes an indication of the period of time.

Some examples of the method, apparatuses, and non-transitory computer-readable medium described herein may further include operations, features, means, or instructions for monitoring the second wireless device using at least one sensor coupled with the first wireless device, where determining that the second wireless and the third wireless device may have a collision likelihood above the threshold may be based on the monitoring.

Some examples of the method, apparatuses, and non-transitory computer-readable medium described herein may further include operations, features, means, or instructions for transmitting a second message including collision avoidance information to the third wireless device based on determining that the second wireless and the third wireless device may have a collision likelihood above the threshold.

In some examples of the method, apparatuses, and non-transitory computer-readable medium described herein, the collision avoidance information includes an indication of a direction for the third wireless device to avoid, a duration of time for the direction to be avoided, an adjustment to a velocity of the third wireless device, an adjustment to a heading angle of the third wireless device, situational information for the second wireless device, or a combination thereof.

Some examples of the method, apparatuses, and non-transitory computer-readable medium described herein may further include operations, features, means, or instructions for determining an identifier of the second wireless device, and transmitting an indication of the identifier to the third wireless device.

Some examples of the method, apparatuses, and non-transitory computer-readable medium described herein may further include operations, features, means, or instructions for receiving from the second wireless device an indication of a period of time the second wireless device may be able to receive communications, and transmitting the collision avoidance information to the second wireless device during the period of time.

Some examples of the method, apparatuses, and non-transitory computer-readable medium described herein may further include operations, features, means, or instructions for determining that the second wireless device may be unaware of the third wireless device, where the collision avoidance information may be transmitted based on determining that the second wireless device may be unaware of the third wireless device.

In some examples of the method, apparatuses, and non-transitory computer-readable medium described herein, determining that the second wireless device may be unaware of the third wireless device may include operations, features, means, or instructions for determining that the second wireless device may be out of communication range with the third wireless device.

Some examples of the method, apparatuses, and non-transitory computer-readable medium described herein may further include operations, features, means, or instructions for determining that the first wireless device may be on a collision-free course with respect to the second wireless device, where the collision avoidance information may be transmitted after determining that the first wireless device may be on the collision-free course.

In some examples of the method, apparatuses, and non-transitory computer-readable medium described herein, the first wireless device and the second wireless device may be moving asynchronously or may have a difference in velocity greater than a threshold.

A method of wireless communication is described. The method may include transmitting, by a first wireless device, situational information for the first wireless device to a second wireless device over a communication link between the first wireless device and the second wireless device, where the situational information indicates position, velocity, direction, or a combination thereof. The method may include receiving, from the second wireless device over the communication link, a message including collision avoidance information that indicates the second wireless device and a third wireless device have a collision likelihood above a threshold. The method may include outputting a signal to prompt a change in position, velocity, direction, or a combination thereof based on the collision avoidance information.

An apparatus for wireless communication is described. The apparatus may include a processor and memory coupled to the processor. The processor and memory may be configured to transmit, by a first wireless device, situational information for the first wireless device to a second wireless device over a communication link between the first wireless device and the second wireless device, where the situational information indicates position, velocity, direction, or a combination thereof. The processor and memory may be configured to receive, from the second wireless device over the communication link, a message including collision avoidance information that indicates the second wireless device and a third wireless device have a collision likelihood above a threshold. The processor and memory may be configured to output a signal to prompt a change in position, velocity, direction, or a combination thereof based on the collision avoidance information.

Another apparatus for wireless communication is described. The apparatus may include means for transmitting, by a first wireless device, situational information for the first wireless device to a second wireless device over a communication link between the first wireless device and the second wireless device, where the situational information indicates position, velocity, direction, or a combination thereof. The apparatus may include means for receiving, from the second wireless device over the communication link, a message including collision avoidance information that indicates the second wireless device and a third wireless device have a collision likelihood above a threshold. The apparatus may include means for outputting a signal to prompt a change in position, velocity, direction, or a combination thereof based on the collision avoidance information.

A non-transitory computer-readable medium storing code for wireless communication is described. The code may include instructions executable by a processor to transmit, by a first wireless device, situational information for the first wireless device to a second wireless device over a communication link between the first wireless device and the second wireless device, where the situational information indicates position, velocity, direction, or a combination thereof. The code may include instructions executable by a processor to receive, from the second wireless device over the communication link, a message including collision avoidance information that indicates the second wireless device and a third wireless device have a collision likelihood above a threshold. The code may include instructions executable by a processor to output a signal to prompt a change in position, velocity, direction, or a combination thereof based on the collision avoidance information.

In some examples of the method, apparatuses, and non-transitory computer-readable medium described herein, the collision avoidance information includes a direction for the first wireless device to avoid for a duration of time, an adjustment to a heading angle of the second wireless device, an adjustment to a velocity of the second wireless device, situational information for the third wireless device, or a combination thereof.

In some examples of the method, apparatuses, and non-transitory computer-readable medium described herein, the signal includes a visual, auditory, or tactile signal detectable by a human.

In some examples of the method, apparatuses, and non-transitory computer-readable medium described herein, the signal includes an electrical signal detectable by an electronic device.

Some examples of the method, apparatuses, and non-transitory computer-readable medium described herein may further include operations, features, means, or instructions for determining that a fourth wireless device within a threshold distance of the first wireless device may be traveling in a same direction or to a same destination as the first wireless device, and transmitting the collision avoidance information to the fourth wireless device.

Some examples of the method, apparatuses, and non-transitory computer-readable medium described herein may further include operations, features, means, or instructions for receiving from the second wireless device an indication of an identifier of the third wireless device, and communicating with the third wireless device about the collision likelihood based on the identifier.

Some examples of the method, apparatuses, and non-transitory computer-readable medium described herein may further include operations, features, means, or instructions for determining that the first wireless device may be in communication range of the third wireless device, where communicating with the third wireless device may be based on determining that the first wireless device may be in communication range of the third wireless device.

A method for wireless communication is described. The method may include receiving, at a first wireless device, situational information for a second wireless device from a third wireless device, where the situational information indicates position, velocity, direction, or a combination thereof. The method may include determining a route of the second wireless device based on the situational information for the second wireless device; and determining that the first wireless device and the second wireless device have a collision likelihood above a threshold based on the route of the second wireless device. The method may include transmitting a message including collision avoidance information to the second wireless device based on determining that the first wireless and the second wireless device have a collision likelihood above the threshold.

An apparatus for wireless communication is described. The apparatus may include a processor and memory coupled to the processor. The processor and memory may be configured to receive, at a first wireless device, situational information for a second wireless device from a third wireless device, where the situational information indicates position, velocity, direction, or a combination thereof. The processor and memory may be configured to determine a route of the second wireless device based on the situational information for the second wireless device. The processor and memory may be configured to determine that the first wireless device and the second wireless device have a collision likelihood above a threshold based on the route of the second wireless device. The processor and memory may be configured to transmit a message including collision avoidance information to the second wireless device based on determining that the first wireless and the second wireless device have a collision likelihood above the threshold.

Another apparatus for wireless communication is described. The apparatus may include means for receiving, at a first wireless device, situational information for a second wireless device from a third wireless device, where the situational information indicates position, velocity, direction, or a combination thereof. The apparatus may include means for determining a route of the second wireless device based on the situational information for the second wireless device. The apparatus may include means for determining that the first wireless device and the second wireless device have a collision likelihood above a threshold based on the route of the second wireless device. The apparatus may include means for transmitting a message including collision avoidance information to the second wireless device based on determining that the first wireless and the second wireless device have a collision likelihood above the threshold.

A non-transitory computer-readable medium storing code for wireless communication is described. The code may include instructions executable by a processor to receive, at a first wireless device, situational information for a second wireless device from a third wireless device, where the situational information indicates position, velocity, direction, or a combination thereof. The code may include instructions executable by a processor to determine a route of the second wireless device based on the situational information for the second wireless device. The code may include instructions executable by a processor to determine that the first wireless device and the second wireless device have a collision likelihood above a threshold based on the route of the second wireless device. The code may include instructions executable by a processor to transmit a message including collision avoidance information to the second wireless device based on determining that the first wireless and the second wireless device have a collision likelihood above the threshold.

Some examples of the method, apparatuses, and non-transitory computer-readable medium described herein may further include operations, features, means, or instructions for determining additional situational information for the second wireless device based on information from one or more sensors coupled with the first wireless device, where the collision likelihood may be determined based on the additional situational information for the second wireless device.

Some examples of the method, apparatuses, and non-transitory computer-readable medium described herein may further include operations, features, means, or instructions for transmitting the additional situational information for the second wireless device to the third wireless device, where the route of the second wireless device may be determined cooperatively with the third wireless device.

Some examples of the method, apparatuses, and non-transitory computer-readable medium described herein may further include operations, features, means, or instructions for receiving additional situational information for the second wireless device from the second wireless device, where route of the second wireless device may be determined based on the additional situational information for the second wireless device.

In some examples of the method, apparatuses, and non-transitory computer-readable medium described herein, the situational information includes a location of the second wireless device within an image frame, one or more coordinates of the second wireless device, a heading angle of the second wireless device, a body position of a user of the second wireless device, or a combination thereof.

DETAILED DESCRIPTION

In some wireless communications systems, wireless devices coupled with vehicles, roadside infrastructure, or vulnerable roadside users (VRUs) may be configured to directly communicate with each other (e.g., with little or no assistance from an intermediary device, such as base station). For instance, vehicle user equipments (VUEs) and VRU UEs may exchange situational information with each other to coordinate movements and avoid collisions or other types of impacts. Situational information may refer to information about a device's positioning, location, or movements (past, present, or future). VUEs may also be equipped to detect various road conditions, including other road users, via sensors coupled with the VUEs. However, VUEs and VRU UEs may have limitations (e.g., power limitations, sensor limitations, etc.) that impede collision prevention. For example, a VUE on a collision course with a VRU may be unaware of the VRU because the sensors on the VUE are obstructed and/or the VUE is out of communication range with the VRU.

According to the techniques described herein, VUEs and VRUs may cooperatively exchange information to prevent collisions between devices that would otherwise be unable to do so. For instance, a VUE that detects a possible collision between two other devices that are unaware of each other may provide a warning to one or both of the devices on behalf of the other device on the collision course. In some cases, the warning may include guidance information about how the receiving device can prevent the collision. Guidance information may refer to any information that guides a device's behavior or informs the device of events, objects, or conditions that the device may encounter or experience. For example, guidance information may include an indication of a change in velocity or heading that will prevent a collision.

Aspects of the disclosure are initially described in the context of wireless communications systems. Aspects of the disclosure are further illustrated by and described with reference to apparatus diagrams, system diagrams, and flowcharts that relate to a cooperative event warning system.

Figure 1:
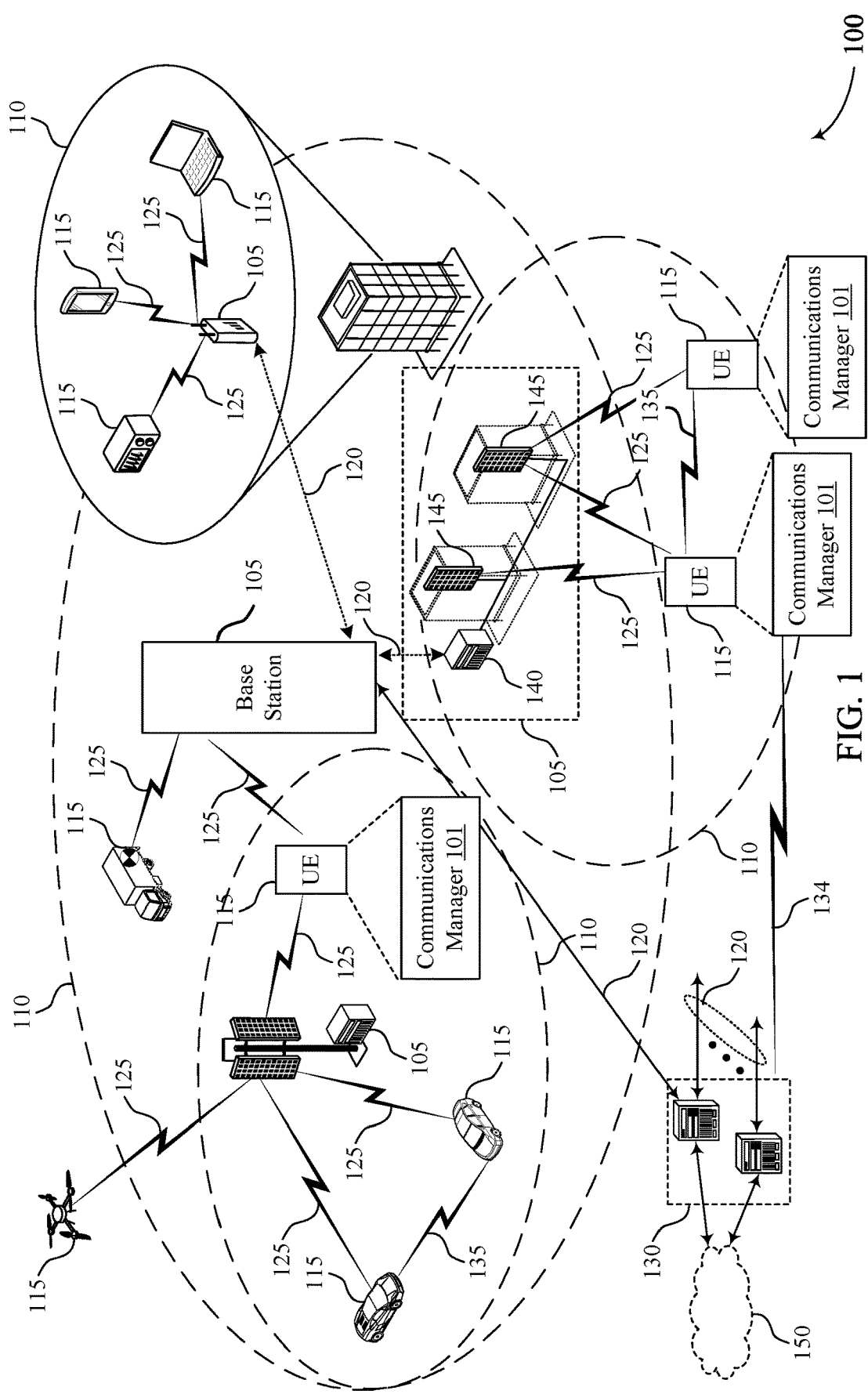
FIG. 1 illustrates an example of a system for wireless communications that supports a cooperative event warning system in accordance with one or more aspects of the present disclosure.

FIG. 1 illustrates an example of a wireless communications system 100 that supports a cooperative event warning system in accordance with aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1. A UE 115 may communicate with the core network 130 through a communication link 134.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as orthogonal frequency division multiplexing (OFDM) or DFT-S-OFDM. In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI)

may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving coverage area 110. In some examples, different coverage areas 110 associated with different technologies may overlap, but the different coverage areas 110 may be supported by the same base station 105. In other examples, the overlapping coverage areas 110 associated with different technologies may be supported by different base stations 105. The wireless communications system 100 may include, for example, a heterogeneous network in which different types of the base stations 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the coverage area 110 of a base station 105. Other UEs 115 in such a group may be outside the coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for impact detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a UE 115 may be, or be physically coupled with, a vehicle (e.g., a motorized vehicle such a car) and may be referred to as a vehicle UE (VUE). Or a UE 115 may be physically coupled with a person or a means of transportation (e.g., bicycle, roller blades, stroller, etc.) in use by the person. This type of UE may be referred to as a pedestrian UE (PUE) or vulnerable roadside user (VRU) UE. A first entity, such as a UE, is "physically coupled with" a second entity, such as a vehicle, if there exists a physical connection between the first entity and the second entity such that a movement by the second entity results in a movement of the first entity. A first entity, such as a UE, is "communicatively coupled with" a second entity, such as a vehicle, if communication signals can be exchanged between the first entity and the second entity. In some examples, a first entity may be both physically coupled and communicatively coupled with a second entity.

VUEs and VRU UEs may support direct or "sidelink" communications (e.g., D2D communications) in which content is directly exchanged between devices (as opposed to being routed through an intermediary device, such as a base station 105). Direct communications between devices may include V2V communications, V2N communications, and V2P communications (e.g., direct communications between a VUE and PUE or VRU UE). Collectively, these types of direction communications may be referred to as V2X communications. In some cases, V2X communications may be allocated a portion of unlicensed spectrum.

Using direction communication, VUEs and VRU UEs may exchange information that facilitates cooperative road-sharing. For example, VUEs and VRU UEs may provide situational information or surroundings information to other devices so that the other devices can react accordingly. Situational information may refer to information about a UE's positioning, location, or movements (past, present, or future). For instance, situational information may refer to a UE's geospatial position, relative position, heading (e.g., direction of travel), velocity, acceleration, altitude, etc. Surroundings information may refer to information about the surroundings of a UE, such as objects or conditions near a UE.

In some cases, a VUE or VRU UE may be equipped with sensors (e.g., radar, cameras, lidar, etc.) that allow the VUE/VRU UE to detect various characteristics of the surroundings (e.g., other vehicles, pedestrians, stop lights, environmental conditions, objects, road conditions, etc.). By exchanging sensor information, situational information, and/or surroundings information, UEs in a traffic environment (e.g., VUEs, VRU UEs) may coordinate movements and avoid events (e.g., impacts, collisions), among other advantages. An impact may refer to two or more objects coming into contact, whereas a collision may refer to a violent impact (e.g., an impact of a threshold force, or with a threshold likelihood of causing injury or damage). Although described with reference to collisions, the techniques described herein may be employed for impacts or other types of events.

Despite the ability to directly communicate and sense the surroundings, two UEs on a collision course may nevertheless be unaware of the impending collision. For example, the UEs may be out of sensor and communication range, leaving each UE ignorant of the other until 1) it is too late to avoid the collision or 2) the safest option for avoiding the collision is no longer available. To solve this problem, the techniques described herein enable a cooperative event warning system between multiple UEs. In some examples, the cooperative warning system may be implemented by a communications manager 101, which may be included in a UE 115.

In a first example of the cooperative event warning system, a first UE 115 may send a warning message about a potential collision to a second UE 115 on behalf of a third UE 115. The first UE 115 may determine the potential collision based on situational information received from the second and third UEs 115. The first UE 115 may send the warning message to the second UE 115 on behalf of the third UE 115 because the third UE 115 is unable to anticipate the collision (e.g., due to sensor limitations) and/or is unable send a warning on its own behalf (e.g., due to communication limitations). In a second example of the cooperative event warning system, the first UE 115 may crowd-source situational information about the second UE 115 from other UEs 115. After using the situational information to determine that the first UE 115 is the UE most likely to collide with the second UE 115, the first UE 115 may send a warning message about the potential collision to the second UE 115.

In both examples of the cooperative event warning system, the warning message may not only inform the second UE 115 of the potential collision but also include collision avoidance information. Collision avoidance information may refer to any information that can be used by the second UE 115 to prevent the collision, and may include situational information for another UE 115, adjustments to velocity and/or heading, a direction to avoid (e.g., a cardinal direction such as North, South, East, West, etc.), a route to take, etc. Providing such collision avoidance information may reduce the likelihood of a collision by the second UE 115.

In addition to preventing collisions or other undesirable events, the cooperative event warning system described herein provide other advantages. For example, the cooperative event warning system may allow for efficient resource allocation between UEs 115 and/or may reduce power consumption at the UEs 115.

Figure 2:
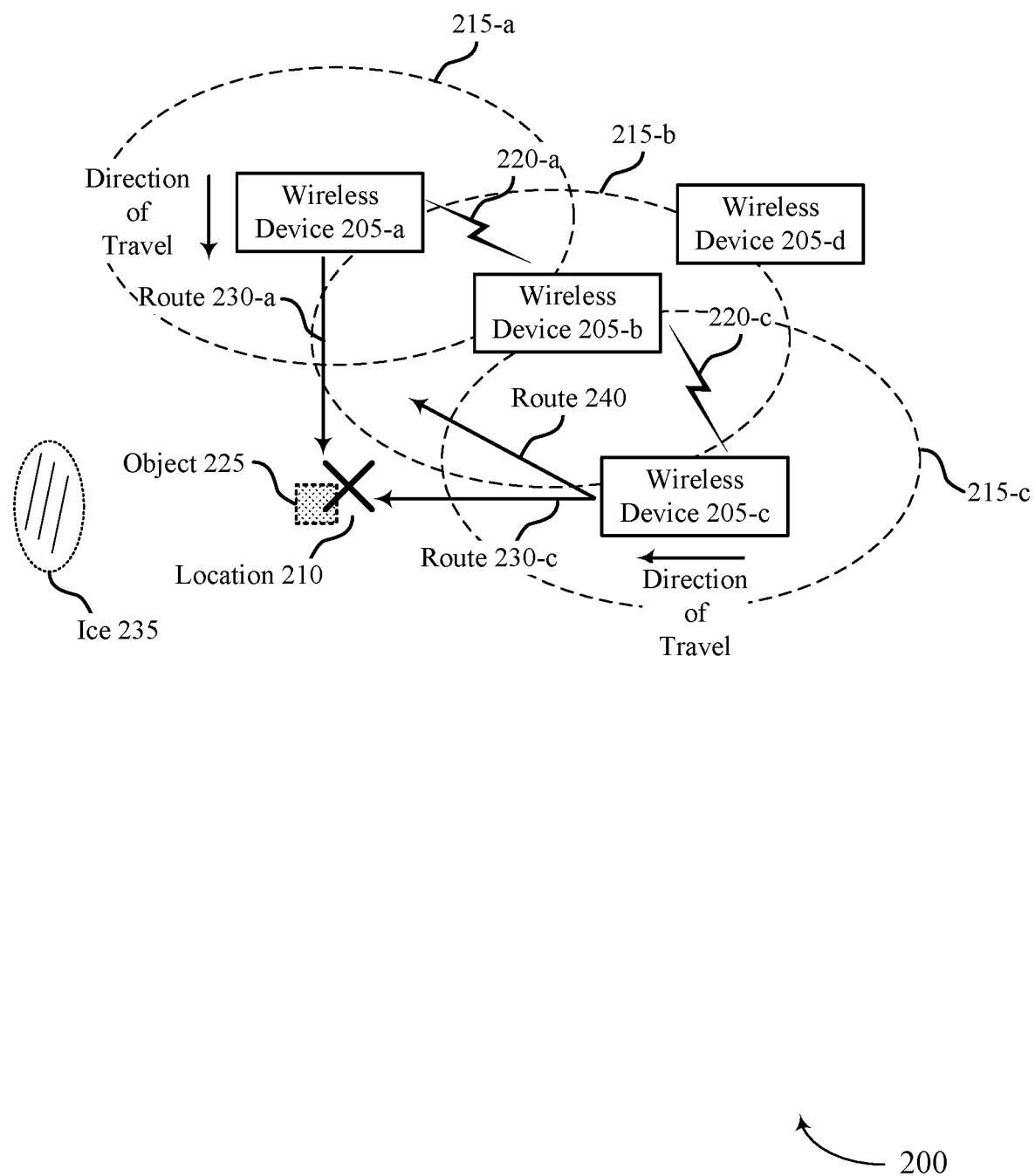
FIG. 2 illustrates an example of a wireless communications system that supports a cooperative event warning system in accordance with one or more aspects of the present disclosure.

FIG. 2 illustrates an example of a wireless communications system 200 that supports a cooperative event warning system in accordance with one or more aspects of the present disclosure. In some examples, wireless communications system 200 may implement aspects of wireless communications system 100. Wireless communications system 200 may include multiple wireless devices 205, including wireless device 205-a, wireless device 205-b, wireless device 205-c, and wireless device 205-d. The wireless devices, which may also be referred to as wireless communication devices, may be examples of a UE 115 as described with reference to FIG. 1. In some examples, the wireless devices 205 may be VUEs or VRUs as described with reference to FIG. 1. For example, wireless device 205-a and wireless device 205-b may be VUEs and wireless device 205-c may be a VRU. However, other implementations are contemplated.

In some examples, wireless device 205-a and wireless device 205-c may be on a collision course (e.g., one or more of wireless device 205-a and wireless device 205-c may be traveling in a manner such that an impact between wireless device 205-a and wireless device 205-a has a likelihood above a threshold likelihood). According to the techniques described herein, wireless devices 205-b may use information from wireless device 205-a, wireless device 205-c, or both, to prevent or reduce the likelihood of the collision. Additionally or alternatively, wireless device 205-b may use information from one or more wireless devices 205 to warn another wireless device 205 of an object, road condition, or possible event other than a collision (e.g., a near miss, a loss of control, a harmful encounter).

The wireless devices 205 may be mobile devices that move around the geographical area in which the wireless communications system 200 is present. For instance, wireless device 205-a may be moving in a first direction (e.g., South) and wireless device 205-c may be moving in a second direction (e.g., West). The direction a wireless device 205 is moving maybe referred to as its direction of travel, heading, or heading angle. In some cases, the movement of two wireless devices 205 may result in a collision unless preventative action is taken. For instance, wireless device 205-a and wireless device 205-c may be moving so as to both arrive at location 210 at the same time or nearly the same time.

Although equipped with sensors and communication abilities, in some cases wireless device 205-a and wireless device 205-c may be prevented from detecting the other wireless device 205 until it is too late to avoid the collision (or too late to exercise the best option for avoiding the collision). For instance, wireless device 205-a may fail to detect wireless device 205-c due to sensor limitations (e.g., the sensors are obstructed by wireless device 205-b) or communication limitations (e.g., wireless device 205-c is outside the communication range 215-a of wireless device 205-a). However, wireless device 205-c may be within the communication range 215-b of wireless device 205-b.

To prevent collisions between two wireless devices 205 that are unaware of each other, wireless device 205-b may warn one or both of the wireless devices 205 on behalf of the other. Wireless device 205-b may predict the possible collision based on situational information received from both wireless devices 205. For example, wireless device 205-b may receive situational information for wireless device 205-a over communication link 220-a. And wireless device 205-b may receive situational information for wireless device 205-c over communication link 220-c. The communications links 220 may be direct communication links that allow content to be transferred between the wireless devices without being routed or relayed through an intermediary device. In some cases, the communications links 220 may convey information over unlicensed spectrum (e.g., spectrum that has been allocated for V2X communications).

In some examples, wireless device 205-b may also receive information about the communication capabilities of the wireless devices 205. For example, wireless device 205-c may transmit information about the ability of wireless device 205-c to receive communications. The information may be associated with a discontinuous reception (DRX) mode of the wireless device 205-c, which may define periods of time when wireless device 205-c is in low-power mode (and thus unable to receive communications) and other periods of time when wireless device 205-c is awake (and thus able to receive communications). Wireless device 205-c may employ DRX or other power-saving measures when wireless device 205-c is a power-limited device such as a PUE or VRU UE. However, VUEs may have access to more power than PUEs/VRU UEs and thus may not implement such a power-saving mechanism. Wireless device 205-c may use the information about the communication capabilities of another wireless device 205 to appropriately time its transmissions (e.g., warning messages) to that wireless device 205.

In addition to receiving situational information from a wireless devices 205, wireless device 205-b may also obtain situational information for that wireless device 205 by using sensors coupled with wireless device 205-b. For example, wireless device 205-b may track the position and/or movement of a wireless device 205 based on data from a lidar system, camera system, radar system, infrared system, thermal sensor system, and the like.

Upon obtaining situational information for wireless device 205-a and wireless device 205-c, wireless device 205-b may determine (e.g., calculate, estimate) predicted routes (e.g., paths, tracks, trajectories, courses) of the wireless devices 205. For example, wireless device 205-b may implement Kalman filters or other types of filters to determine a potential or likely path or destination for each wireless device 205. Thus, wireless device 205-b may determine one or more locations a wireless device 205 is expected to be at one or more particular times. Based on the predicted paths for wireless devices 205-a and 205-c, wireless device 205-b may determine that wireless device 205-a and wireless device 205-c are on a collision course (e.g., have a likelihood of colliding greater than a threshold amount). In FIG. 2, wireless device 205-a may have route 230-a and wireless device 205-c may have route 230-c. However, other routes are contemplated.

After determining that wireless device 205-a and wireless device 205-c are likely to collide (e.g., be in a same physical location within a threshold amount of time of each other), wireless device 205-b may transmit a warning message (e.g., in a page) to wireless device 205-a and/or wireless device 205-c. The warning message may include guidance information that indicates the collision and/or how to prevent the collision. Thus, the guidance information may include collision avoidance information. In some cases, the guidance information provided to one device may include information about the other device likely to be involved in the collision. For example, the situational information for wireless device 205-c may be provided to wireless device 205-a so that wireless device 205-a can determine how to prevent the collision. Because the processing power used to determine preventative action may be considerable, wireless device 205-b may include the situational information in the collision avoidance information when the receiving device (e.g., a VUE) has the computational capacity to handle the task in a timely fashion.

Although described with reference to a collision, guidance information may be used to indicate other potential events and/or how to prevent or decrease the likelihood of those events. So, guidance information may refer to any information that guides a wireless device 205 or informs the wireless device 205 of events, objects, or conditions that the wireless device 205 may encounter or experience.

In some cases, the collision avoidance information may include information on one or more actions for a wireless device 205 to take (e.g., recommended actions) to prevent the collision. For example, the collision avoidance information may include an indication of a direction (e.g., South) the wireless device 205 should avoid and a duration of time the direction should be avoided (e.g., three seconds (s)). Or the collision avoidance information may include a recommended heading angle, velocity, or route (e.g., route 240, which may be a collision-free route). In some examples, the collision avoidance information may include a recommended adjustment to a current heading angle, velocity, or route.

In some examples, the warning message may be an application layer message and the information may be conveyed in data fields (DFs) of the message. For example, the message may include one or more data fields that include one or more information elements (IEs) containing collision avoidance information. An information element may also be referred to as a data element. In one example, the warning message may include a data field DF_DTime that conveys information about the duration of time that the warning message is applicable. For instance, the data field DF_DTime may include one or more data fields or data elements that convey the warning start time (e.g., DF_DTime), end time (e.g., DF_DTime), and/or duration (e.g., DF_Duration). The start time data field DF_DTime may include one or more data elements that indicate the warning start time in of hours (e.g., DE_DHour), minutes (e.g., DE_DMinute), seconds (e.g., DE_DSecond), milliseconds (ms) (e.g., DE_DmSecond), etc. The end time data field DF_DTime may include one or more data elements that indicate the warning end time in of hours (e.g., DE_DHour), minutes (e.g., DE_DMinute), seconds (e.g., DE_DSecond), milliseconds (ms) (e.g., DE_DmSecond), etc. The duration data element DE_Duration may include one or more data elements that indicate the warning duration time in seconds.

Additionally or alternatively, the warning message may include a data field or data element that conveys information about the direction a wireless device 205 should avoid. For example, the warning message may include data element DE_Directioni, which may indicate a direction such as North, South, West, East, Northeast, Northwest, Southeast, or Southwest. Additionally or alternatively, the warning message may include a data field or data element that conveys information about a heading a wireless device 205 should avoid. For example, the warning message may include data element DE_Heading, which may indicate a quantity of degrees. Additionally or alternatively, the warning message may include a data field or data element that conveys information about a track the wireless device should take to avoid the collision or a track of the other wireless device 205 involved in the potential collision. For example, the warning message may include data element DE_Waypoints, which may indicate a heading, direction, and/or time.

Tables 1 and 2 show examples of data fields and data elements that may be included in the warning message to a VRU UE. However, other types and combinations of data fields and data elements are contemplated, and the data fields and data elements may be transmitted to either a VRU UE or VUE.

TABLE 1

Warning Message Data Fields and Data Elements

| Data Field | Description | Data Element |
|---|---|---|
| VRU UE guidance time | VRU warning start time | DF_DTime |
|  | VRU warning end time | DF_DTime |
|  | VRU warning duration | DE_Duration |
| VRU UE guidance direction | Direction VRU should follow to avert collision | DE_Direction |
|  | Heading angle VRU should follow to avert collision | DE_Heading |
| VRU UE collision vehicle information | The track of the VUE potentially involved in the collision | DE_Waypoints |
| VRU UE guidance information | The track that VRU should follow to avoid collision | DE_Waypoints |

TABLE 2

Warning Message Data Fields and Data Elements

| Units | Description |
|---|---|
| DE_DTime | DE_DHour ::= INTEGER (0 . . . 31)-units of hours DE_DMinute ::= INTEGER (0 . . . 63)-units of minutes DE_DSecond ::= INTEGER (0 . . . 65535)-units of milliseconds |
| DE_Duration | DE_Duration ::= INTEGER (0 . . . 3600)-units of seconds |
| DE_Direction | DE_Direction ::= enum (NORTH, SOUTH, WEST, EAST, NORTHEAST, NORTHWEST, SOUTHEAST, SOUTHWEST) |
| DE_Heading | DE_Heading ::= INTEGER-(25, 90, 135, 180, −45, −90, −135, −180) units of degrees |
| DE_Waypoints | Tuple containing: [DE_Heading, DE_Direction, DE_Dtime] |

In some examples, wireless device 205-*b* may determine whether wireless device 205-*b* is on a collision course with either wireless device 205-*a* or wireless device 205-*c*. In such cases, wireless device 205-*b* may transmit the warning message(s) to the other wireless devices 205 even though wireless device 205-*b* is on a collision-free course (e.g., is not likely to collide with either wireless device).

Upon receiving a warning message from wireless device 205-*b*, wireless device 205-*c* may use the guidance information in the warning message as a basis for taking one or more collision-avoidance actions. In some examples (e.g., when wireless device 205-*c* is a VRU UE), wireless device 205-*c* may output one or more signals that prompt avoidance action or behavior by a user. For example, wireless device 205-*c* may output one or more visual, auditory, or tactile signals that are detectable by a human. For instance, wireless device 205-*c* may output (e.g., display or project) an image that indicates a particular avoidance action (e.g., a change in velocity or heading). Additionally or alternatively, wireless device 205-*c* may output a noise or vibrate in a manner that indicates the collision avoidance action. In other examples (e.g., when wireless device 205-*c* is a VUE), wireless device 205-*c* may output one or more signals that prompt another device to take avoidance action. For instance, wireless device 205-*c* may output an electrical signal detectable by an electronic device (e.g., a navigation system, a self-driving system) that is communicatively coupled with the wireless device 205-*c*. In some examples (e.g., in assisted driving scenarios), wireless device 205-*c* may output one or more signals that are detectable by a human as well as one or more signal that are detectable by an electronic device.

In some examples, wireless device 205-*b* may transmit a warning message to another wireless device 205 based on determining that the other wireless device 205 is unaware of the potential collision. For example, wireless device 205-*b* may transmit a warning message to wireless device 205-*a* upon determining that wireless device 205-*a* is unaware of wireless device 205-*c*. Wireless device 205-*b* may determine the awareness of wireless device 205-*a* based on the communication range 215-*a* of wireless device 205-*a* and/or the communication range 215-*c* of wireless device 205-*c*. For example, wireless device 205-*b* may determine that wireless device 205-*a* is outside communication range 215-*c*. Additionally or alternatively, wireless device 205-*b* may determine the awareness of wireless device 205-*a* based on the range or capability of one or more sensors coupled with wireless device 205-*a*.

In addition to possible collisions between wireless devices, aspects of the cooperative event warning system described herein may be used to warn a wireless device 205 of other types scenarios. For example, a first wireless device 205 may inform a second wireless device 205 of an object, road condition, or possible event based on situational information from a third wireless device 205 and/or on behalf of the third wireless device 205. With reference to FIG. 2, wireless device 205-*b* may inform wireless device 205-*c* that there is an object 225 (e.g., a traffic cone, an animal, a puddle, a pothole, a speed bump), blockage, road condition (e.g., flooding, ice 235), or other obstruction or impediment at location 210 (or another location). Additionally or alternatively, wireless device 205-*b* may inform wireless device 205-*c* that wireless device 205-*c* is on collision course with, or likely to pass within a threshold distance, of the object or road condition. In some examples, wireless device 205-*b* may provide guidance information to wireless device 205-*c* so that the wireless device 205-*c* can avoid encountering the object or road condition or prevent the event from occurring. In some examples, wireless device 205-*b* may provide information about the object or condition to wireless device 205-*c* so that wireless device 205-*c* can factor the object or condition into behavioral decisions.

Figure 3:
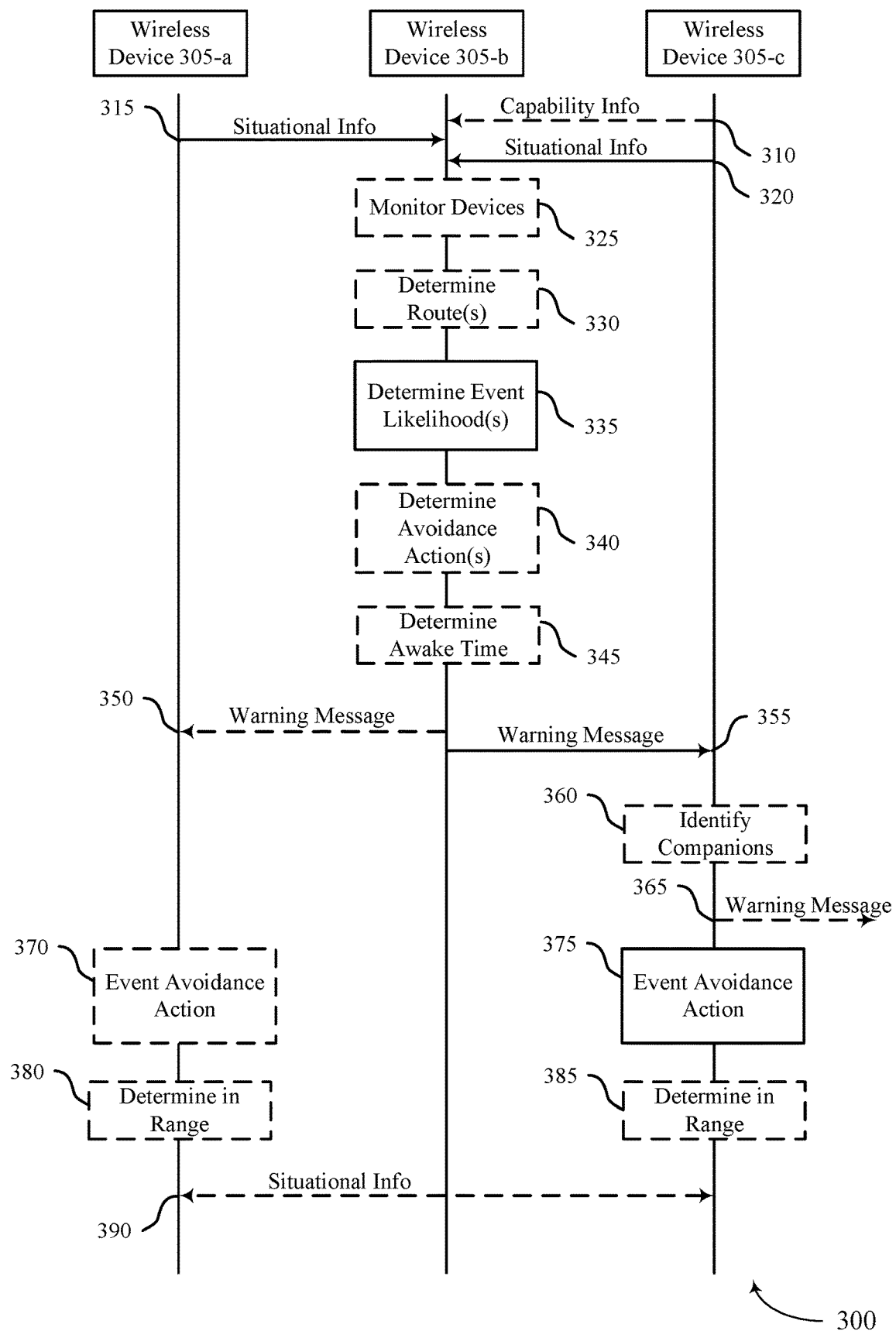
FIG. 3 illustrates an example of a process flow that supports a cooperative event warning system in accordance with one or more aspects of the present disclosure.

FIG. 3 illustrates an example of a process flow 300 that supports a cooperative event warning system in accordance with one or more aspects of the present disclosure. In some examples, process flow 300 may implement aspects of wireless communications system 100. Process flow 300 may be an example of a first implementation of a collision or event warning system in which a first wireless device warns a second wireless device of a potential collision on behalf of a third wireless device.

In some examples, process flow 300 may implement aspects of wireless communications system 100 or 200. Process flow 300 may be implemented by wireless device 305-a, wireless device 305-b, and wireless device 305-c, which may be examples of a UE, VUE, VRU UE, or wireless device described herein. The wireless devices 305 may be traveling in a manner that prevents platooning, which is an ad hoc formation of a communication group that allows closely-spaced devices (e.g., VUEs) traveling at similar speeds to coordinate movements. For example, the wireless device 305 may be prevented from platooning (e.g., tightly coordinating or synchronizing movements) because they are traveling in different directions, traveling with velocities that are outside a threshold range of each other, and/or positioned outside a threshold range of each other.

Alternative examples of the following may be implemented, where some operations are performed in a different order than described or are not performed at all. In some cases, operations may include additional features not mentioned below, or further operations may be added.

At 310, wireless device 305-c may transmit, and wireless device 305-b may receive, information about the capabilities of wireless device 305-c or a device coupled with wireless device 305-c. For instance, wireless device 305-c may transmit an indication of communication capabilities of wireless device 305-c (e.g., DRX information) or movement capabilities of a vehicle coupled with wireless device 305-c (e.g., deceleration or turning capabilities). In one example, wireless device 305-c may transmit an indication of one or more periods of time wireless device 305-c is able to receive communications from wireless device 305-b.

At 315, wireless device 305-a may transmit, and wireless device 305-b may receive, situational information for wireless device 305-a. The situational information may be determined by wireless device 305-a and transmitted over a communication link between wireless device 305-a and wireless device 305-b. At 320, wireless device 305-c may transmit, and wireless device 305-b may receive, situational information for wireless device 305-c. The situational information may be determined by wireless device 305-c and transmitted over a communication link between wireless device 305-c and wireless device 305-b. The situational information transmitted at 315 and/or 320 may be transmitted autonomously by wireless devices 305-a/305-c (e.g., based on detecting wireless device 305-b) or in response to a request from wireless device 305-b. In some cases, the situational information may be conveyed in one or more safety messages (e.g., a public safety message (PSM)). Although a single transmission of situational information is shown per wireless device, multiple transmissions of situational information may occur so that the situational information considered by wireless device 305-b remains up-to-date.

At 325, wireless device 305-b may obtain additional situational information for wireless device 305-a by monitoring wireless device 305-a via one or more sensors physically or communicatively coupled with wireless device 305-b. Wireless device 305-b may also obtain additional situational information for wireless device 305-c by monitoring wireless device 305-c via one or more sensors physically or communicatively coupled with wireless device 305-b.

At 330, wireless device 305-b may determine one or more potential routes for wireless device 305-a based on the situational information for wireless device 305-a. Wireless device 305-b may also determine one or more potential routes for wireless device 305-c based on the situational information for wireless device 305-c. A potential route may be an expected or likely route of wireless device 305. In some cases, wireless device 305-b may determine one or more potential routes for wireless device 305-b based on situational information for wireless device 305-b. In some cases, determining a potential route for a wireless device involves determining when the wireless device is anticipated to be at various locations. In some examples, the potential route(s) for a wireless device 305 may be based on information about the characteristics of the surroundings (e.g., visibility, environmental conditions such as ice, road topology, etc.).

At 335, wireless device 305-b may determine a likelihood of an event (e.g., an impact, a collision) between wireless device 305-a and wireless device 305-c. The likelihood may be based on the situational information and/or potential routes for the wireless devices 305-a, 305-c. If at 330 wireless device 305-b determines multiple potential routes for a wireless device 305, the wireless device may perform a separate collision analysis for each route. Alternatively, the wireless device 305 may perform an initial (e.g., limited) analysis to see which route is more likely to lead to a collision, then perform a more rigorous collision analysis for that route. For example, wireless device 305-b may determine that a first potential route (e.g., taking the left prong of a road fork) decreases the risk of collision whereas a second potential route (e.g., taking the right prong of a road fork) increases the risk of collision. In such cases, wireless device 305-b may save processing power and time by performing a complete collision analysis for the riskiest potential route (e.g., the second potential route) and not the other potential route(s).

In some cases, wireless device 305-b may determine that the likelihood of a collision between wireless device 305-a and wireless device 305-c is greater than a threshold value. In some examples, wireless device 305-b may also determine a likelihood of a collision between wireless device 305-b and wireless device 305-a and/or wireless device 305-c. For example, wireless device may determine that the likelihood of a collision between wireless device 305-b and wireless device 305-a and/or wireless device 305-c is less than a threshold value. Thus, wireless device 305-b may determine that it is on a collision-free course with respect to wireless device 305-a and wireless device 305-c.

At 340, wireless device 305-b may determine one or more actions that will prevent a predicted collision between wireless device 305-a and wireless device 305-c. For example, wireless device 305-b may determine one or more actions that wireless device 305-a can take to avoid the collision. Additionally or alternatively, wireless device 305-b may determine one or more actions that wireless device 305-a can take to avoid the collision. In some cases, the avoidance action may be a maneuver or behavior associated with a position, heading, or velocity of the wireless device. In some cases, wireless device 305-b may determine the avoidance action(s) based on movement capabilities of wireless device 305-a and/or wireless device 305-c. In some cases, wireless device 305-a may determine multiple actions that will prevent the collision. In such cases, wireless device 305-a may prioritize the actions based on factors such as legality, feasibility, and/or safety, among other factors.

At 345, wireless device 305-b may determine a period of time during which wireless device 305-c is able to receive communications from wireless device 305-b. For example, wireless device 305-b may determine a period of time in which wireless device 305-c is awake (e.g., has its receive circuitry turned on or tuned to a particular frequency) based on capability information received at 310. Such a determination may serve as a basis for sending a transmission to wireless device 305-c at 355.

At 350, wireless device 305-b may transmit a warning message to wireless device 305-a. The warning message may indicate that wireless device 305-a is on a collision course with wireless device 305-c. The warning message may also indicate one or more actions wireless device 305-c can take to prevent the collision (e.g., the warning message may include collision avoidance information). Additionally or alternatively, the warning message may include situational information for wireless device 305-c or an indication of collision avoidance information sent to wireless device 305-c (e.g., so wireless device 305-a can anticipate the avoidance action taken by wireless device 305-a). In some examples, the warning message may include an indication of an identifier of wireless device 305-c so that wireless device 305-a can quickly communicate with wireless device 305-c when wireless device 305-a comes into communication range with wireless device 305-c. The identifier of wireless device 305-c may have been transmitted to wireless device 305-b during an earlier communication with wireless device 305-c.

At 355, wireless device 305-b may transmit a warning message to wireless device 305-c. In some cases, the warning message may be transmitted so as to arrive during a period of time that wireless device 305-c is awake to receive the warning message. The warning message may indicate that wireless device 305-c is on a collision course with wireless device 305-a. The warning message may also indicate one or more actions wireless device 305-a can take to prevent the collision (e.g., the warning message may include collision avoidance information). Additionally or alternatively, the warning message may include situational information for wireless device 305-a or an indication of collision avoidance information sent to wireless device 305-a (e.g., so wireless device 305-c can anticipate the avoidance action taken by wireless device 305-a). In some examples, the warning message may include an indication of an identifier of wireless device 305-a so that wireless device 305-c can quickly communicate with wireless device 305-a when wireless device 305-c comes into communication range with wireless device 305-a. The identifier of wireless device 305-a may have been transmitted to wireless device 305-b during an earlier communication with wireless device 305-a.

Wireless device 305-b may perform one or more of the operations between 320 and 355 based on determining that wireless device 305-a is unaware of wireless device 305-c or unable to communicate with wireless device 305-c. In some cases, wireless device 305-b may determine that wireless device 305-a is unaware of wireless device 305-a based on determining that wireless device 305-a is outside a communication range with wireless device 305-c. Similarly, wireless device 305-b may perform one or more of the operations between 320 and 355 based on determining that wireless device 305-c is unaware of wireless device 305-a or unable to communicate with wireless device 305-a. In some cases, wireless device 305-b may determine that wireless device 305-c is unaware of wireless device 305-a based on determining that wireless device 305-c is outside a communication range with wireless device 305-a.

In some examples, the messages transmitted by the wireless devices 305 may be paging messages. For example, one or more of the messages transmitted at 310, 315, 320, 350, and/or 355 may be a paging message.

At 360, wireless device 305-c may identify one or more companion wireless devices that are also at risk of collision with wireless device 305-a. For example, wireless device 305-c may determine one or more wireless devices that are within a threshold distance of wireless device 305-c and/or traveling in a same manner or to a same destination as wireless device 305-c. After identifying companion wireless devices, wireless device 350-c may, at 365, relay the warning message, or aspects of the warning message, to the companion wireless devices.

At 370, wireless device 305-a may take one or more actions to avoid the event (e.g., the collision) based on the warning message received at 350. At 375, wireless device 305-c may take one or more actions (e.g., implement one or more behaviors) to avoid the event (e.g., the collision) based on the warning message received at 355. The action taken by a wireless device to avoid the collision may be based on information included in the warning message, among other information. The action taken by a wireless device to avoid the collision may include modifying a heading or velocity of the wireless device and/or outputting a signal to modify the heading or velocity of the wireless device.

At 380, wireless device 305-a may determine that it has come into communication range with wireless device 305-c. Similarly, at 385, wireless device 305-c may determine that it has come into communication range with wireless device 305-a. Accordingly, at 390, wireless device 305-a and wireless device 305-c may communicate with each other over a communication link between wireless device 305-a and wireless device 305-c. In some examples, the communication between wireless device 305-a and wireless device 305-c may be based on the identifiers of wireless device 305-a and 305-c received from wireless device 305-b. In some examples, wireless device 305-a and wireless device 305-c may exchange situational information over the communication link. Thus, the cooperative event warning system may prevent a collision.

Figure 4A:
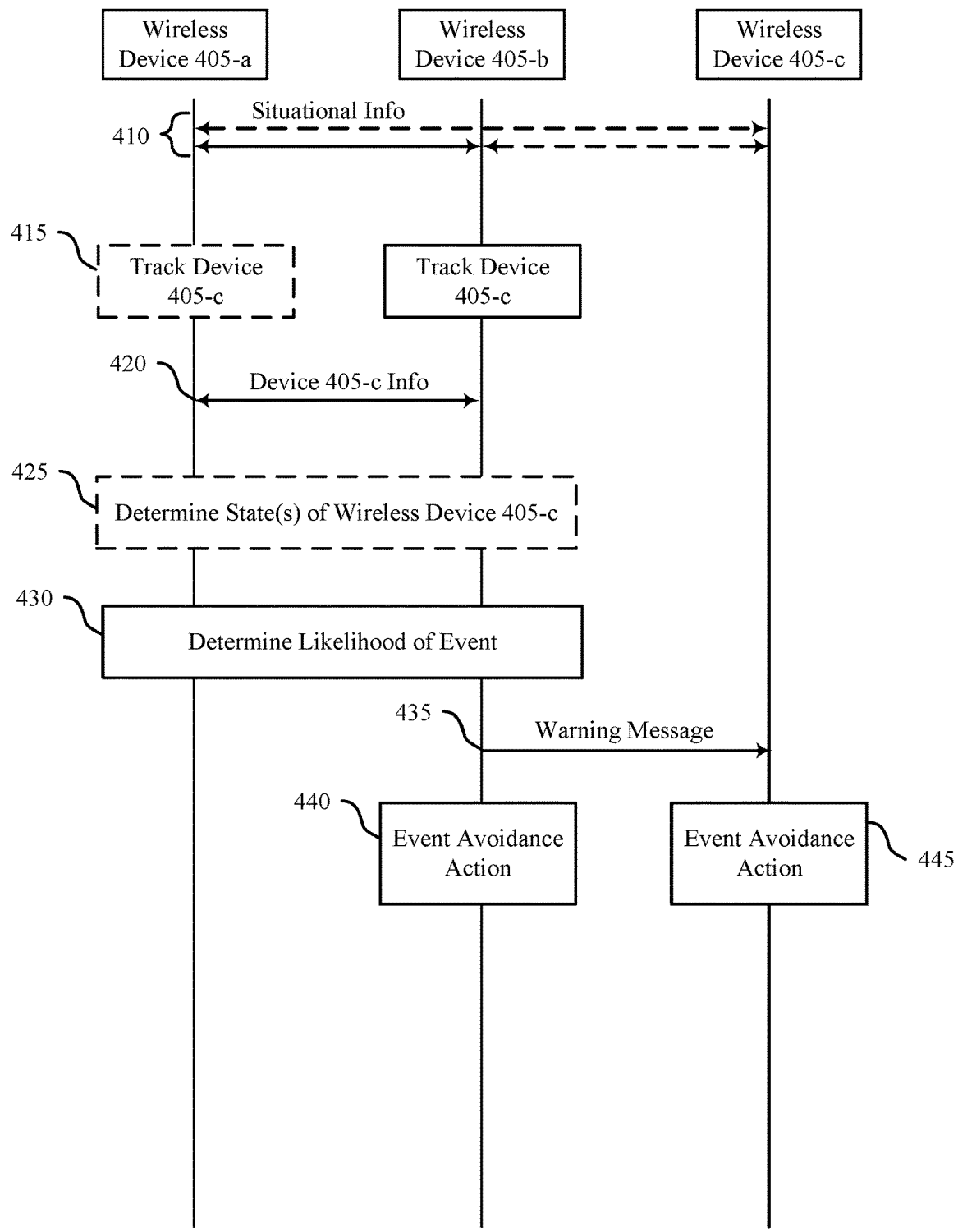
FIGS. 4A and 4B illustrate examples of process flows that support a cooperative event warning system in accordance with one or more aspects of the present disclosure.

FIG. 4A illustrates an example of a process flow 400-a that supports a cooperative event warning system in accordance with one or more aspects of the present disclosure. In some examples, process flow 400-a may implement aspects of wireless communications system 100. Process flow 400-a may be an example of a second implementation of a collision warning system in which multiple wireless devices cooperatively determine another device's likely route so that the wireless device most likely to collide with the other device can send a warning message to the other device. In the given example, three wireless devices 405 are depicted, and wireless device 405-b is on a collision course with wireless device 405-c. However, other implementations are contemplated, including implementations with different quantities of wireless devices 405.

In some examples, process flow 400-a may implement aspects of process flow 300 or wireless communications system 100 or 200. Process flow 400-a may be implemented by wireless device 405-a, wireless device 405-b, and wireless device 405-c, which may be examples of a UE, VUE, VRU UE, or wireless device described herein. In some cases, the wireless devices 405 may be traveling in a manner that prevents platooning. In some examples, wireless device 405-a and wireless device 405-b may be VUEs and wireless device 405-c may be a VRU UE. However, other implementations are contemplated.

Alternative examples of the following may be implemented, where some operations are performed in a different order than described or are not performed at all. In some cases, operations may include additional features not mentioned below, or further operations may be added.

At 410, two or more of the wireless devices 405 may exchange situational information. In some examples, wireless device 405-b may receive situational information for wireless device 405-c from multiple wireless devices. For example, wireless device 405-b may receive situational information for wireless device 405-c from wireless device 405-a and/or wireless device 405-c, among other wireless devices. Similarly, wireless device 405-a may receive situational information for wireless device 405-c from wireless device 405-b and/or wireless device 405-c, among others. In some examples, the situational information for wireless device 405-c may be exchanged based on wireless device 405-c being identified as a VRU UE. In some examples, the communications at 410 may be referred to as, or included in, a safety message exchange.

At 415, multiple wireless devices 405 may each monitor and track wireless device 405-c. For example, wireless device 405-a may monitor the movement of wireless device 405-c using sensors coupled with wireless device 405-a. Similarly, wireless device 405-b may monitor the movement of wireless device 405-c using sensors coupled with wireless device 405-b. In some cases, the monitoring of wireless device 405-c may be based on situational information for wireless device 405-c that is obtained (e.g., received and/or determined) at 410.

At 420, the wireless devices monitoring wireless device 405-c (e.g., wireless device 405-a and wireless device 405-b) may exchange information about wireless device 405. In some examples, the wireless devices may exchange additional situational information for wireless device 405-c based on the monitoring at 415. In some examples, the situational information may include information indicating a bounding box associated with wireless device 405-c (e.g., a location of wireless device 405-c within an image frame captured by the transmission wireless device). Additionally or alternatively, the situational information may include one or more coordinates of wireless device 405-c (e.g., with respect to an earth coordinate frame). Additionally or alternatively, the situational information may include an indication of a body position or pose of a user of wireless device 405-c. Additionally or alternatively, the situational information may include sensor information related to wireless device 405-c.

At 425, the wireless devices monitoring wireless device 405-c (e.g., wireless device 405-a and wireless device 405-b) may determine a past, present, and/or future state (e.g., position, route, etc.) of wireless device 405-c. For example, wireless device 405-a and wireless device 405-b may cooperatively or independently infer or determine the current location and movement of wireless device 405-c, as well as predict the next few locations and movements of wireless device 405-c. In some examples, the determination(s) at 425 may be based on situational information obtained at 410 and/or 420.

At 430, the wireless devices monitoring wireless device 405-c (e.g., wireless device 405-a and wireless device 405-b) may cooperatively or independently determine a likelihood of an event (e.g., an impact, a collision) between wireless device 405-c and one or more of the wireless devices. For example, the wireless devices may determine 1) the likelihood of wireless device 405-a colliding with wireless device 405-c and 2) the likelihood of wireless device 405-b colliding with wireless device 405-c. In the given example, the wireless devices may determine that wireless device 405-b is the most likely to collide with wireless device 405-c (e.g., the wireless devices may determine that the likelihood of collision between wireless device 405-b and wireless device 405-c is greater than a threshold value, and/or greater than the likelihood of collision between wireless device 405-a and wireless device 405-c). Thus, at 435, the wireless device most likely to collide with wireless device 405-c (e.g., wireless device 405-b) may send a warning message to wireless device 405-c. Accordingly, at 440 and 445, wireless device 405-b and wireless device 405-c, may, respectively, take one or more actions that prevent the event (e.g., the collision).

Although the wireless device most likely to collide with wireless device 405-c transmits the warning in process flow 400-a, other implementations are contemplated. For example, the wireless device 405 that transmits the warning may be the wireless device 405 that a) is closest to wireless device 405-c b) already has a communication link established with wireless device 405-c, c) has the best communication link with wireless device 405-c, or d) detects the collision first, among other possibilities. The criteria for selecting the wireless device 405 that sends the warning may be agreed upon by the wireless devices 405, preconfigured at the wireless devices 405, or conveyed to the wireless devices by a third party. Alternatively, multiple wireless device 405 may transmit respective warnings to wireless device 405-c.

In some examples, the messages transmitted by the wireless devices 405 may be paging messages. For example, one or more of the messages transmitted at 410, 420, and/or 435 may be a paging message.

Figure 4B:
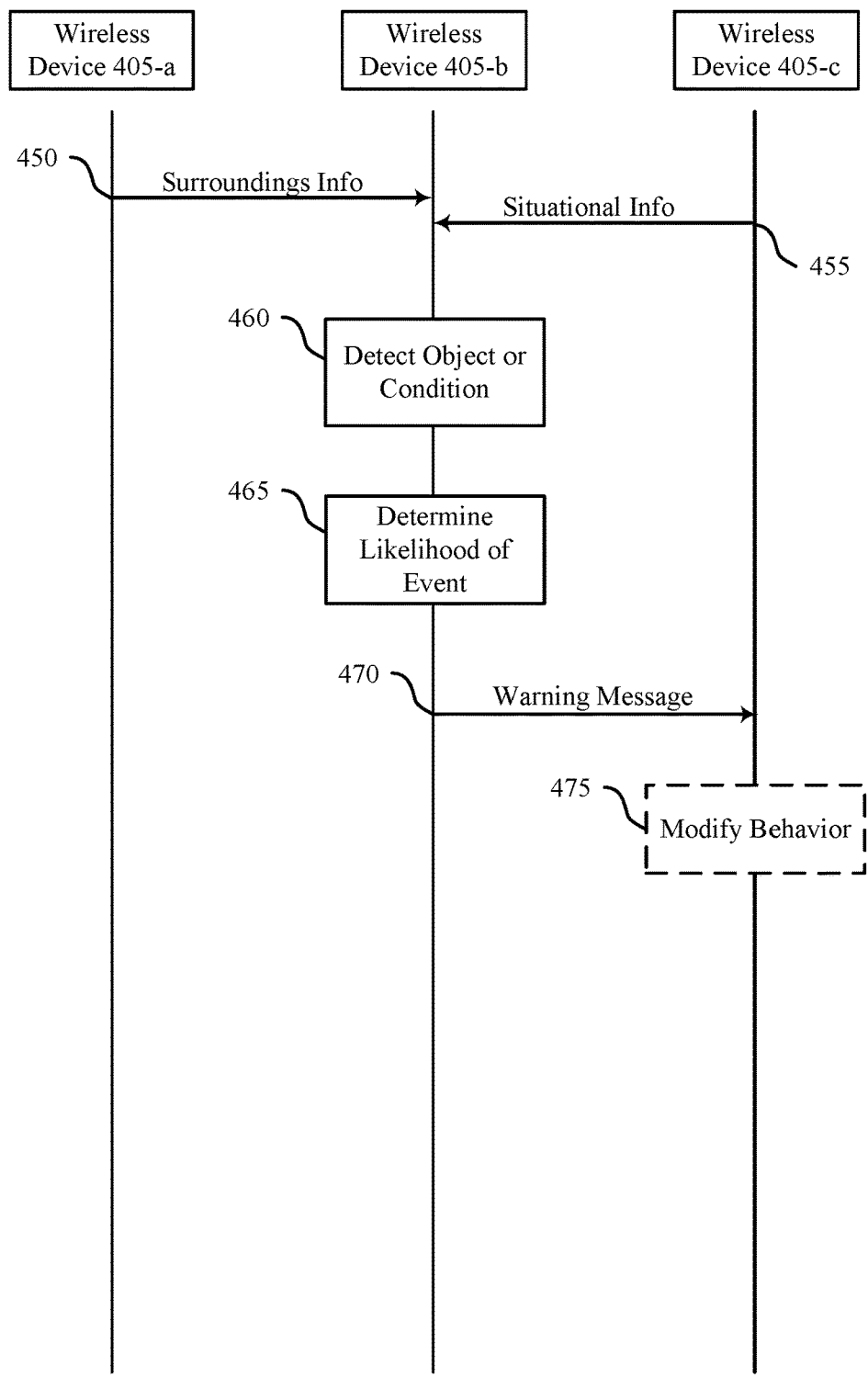

FIG. 4B illustrates an example of a process flow 400-b that supports a cooperative event warning system in accordance with one or more aspects of the present disclosure. In some examples, process flow 400-b may implement aspects of wireless communications system 100 or wireless communications system 200. Process flow 400-b may be an example of a third implementation of a warning system in which multiple wireless devices cooperatively determine surroundings information that is reported to one or more other wireless devices. In the given example, three wireless devices 405 are depicted. However, other implementations are contemplated, including implementations with different quantities of wireless devices 405.

In some examples, process flow 400-b may implement aspects of process flow 300, process flow 400-a. Process flow 400-b may be implemented by wireless device 405-a, wireless device 405-b, and wireless device 405-c, which may be examples of a UE, VUE, VRU UE, or wireless device described herein. In some cases, the wireless devices 405 may be traveling in a manner that prevents platooning. In some examples, wireless device 405-a and wireless device 405-b may be VUEs and wireless device 405-c may be a VRU UE. However, other implementations are contemplated.

Alternative examples of the following may be implemented, where some operations are performed in a different order than described or are not performed at all. In some cases, operations may include additional features not mentioned below, or further operations may be added.

At 450, wireless device 405-b may receive surroundings information from wireless device 405-a or exchange surroundings information with wireless device 405-a. Surroundings information may refer to information about the surroundings or environment for a wireless device 405. For example, surroundings information may include an indication of an object or road condition. In some examples, wireless device 405-*b* may receive surroundings information from multiple wireless devices. In some examples, wireless device 405-*b* may also receive situational information from wireless device 405-*a* or exchange situational information with wireless device 405-*a*.

At 455, wireless device 405-*b* may receive situational information from wireless device 405-*c* or exchange situational information with wireless device 405-*c*.

At 460, wireless device 405-*b* may detect an object, a road condition, or both, based on the soundings information received at 450. For example, wireless device 405-*b* may detect that there is a puddle at a particular location. At 465, wireless device 405-*b* may determine the likelihood of an event based on the surroundings information received at 450 and the situational information received at 455. For example, wireless device 405-*b* may determine that wireless device 405-*c* is on course to hit, or pass within a threshold distance of, the object or road condition.

At 470, wireless device 405-*b* may transmit a warning message to wireless device 405-*c* based on the likelihood of the event satisfying a threshold. The warning message may include guidance information that indicates the object, the road condition, the location of the object, the location of the road condition, or a combination thereof. Additionally or alternatively, the guidance information may indicate one or more actions the wireless device 405-*c* can take to prevent the event or reduce the likelihood of the event. For example, the guidance information may indicate a direction, heading, trajectory, velocity, acceleration, or the like, or changes in these parameters, that wireless device 405-*c* could implement to prevent the event or reduce the likelihood of the event.

At 475, wireless device 405-*c* may modify the behavior of wireless device 405-*c* based on the warning message received at 470. In some examples, wireless device 405-*c* may take one or more actions based on the guidance information included in the warning message (e.g., wireless device 405-*c* may change its heading so as to avoid the location of the object or road condition). In some examples, the one or more actions may be the one or more actions indicated by the guidance information in the warning message (e.g., wireless device 405-*c* change its velocity as indicated by the guidance information).

Figure 5:
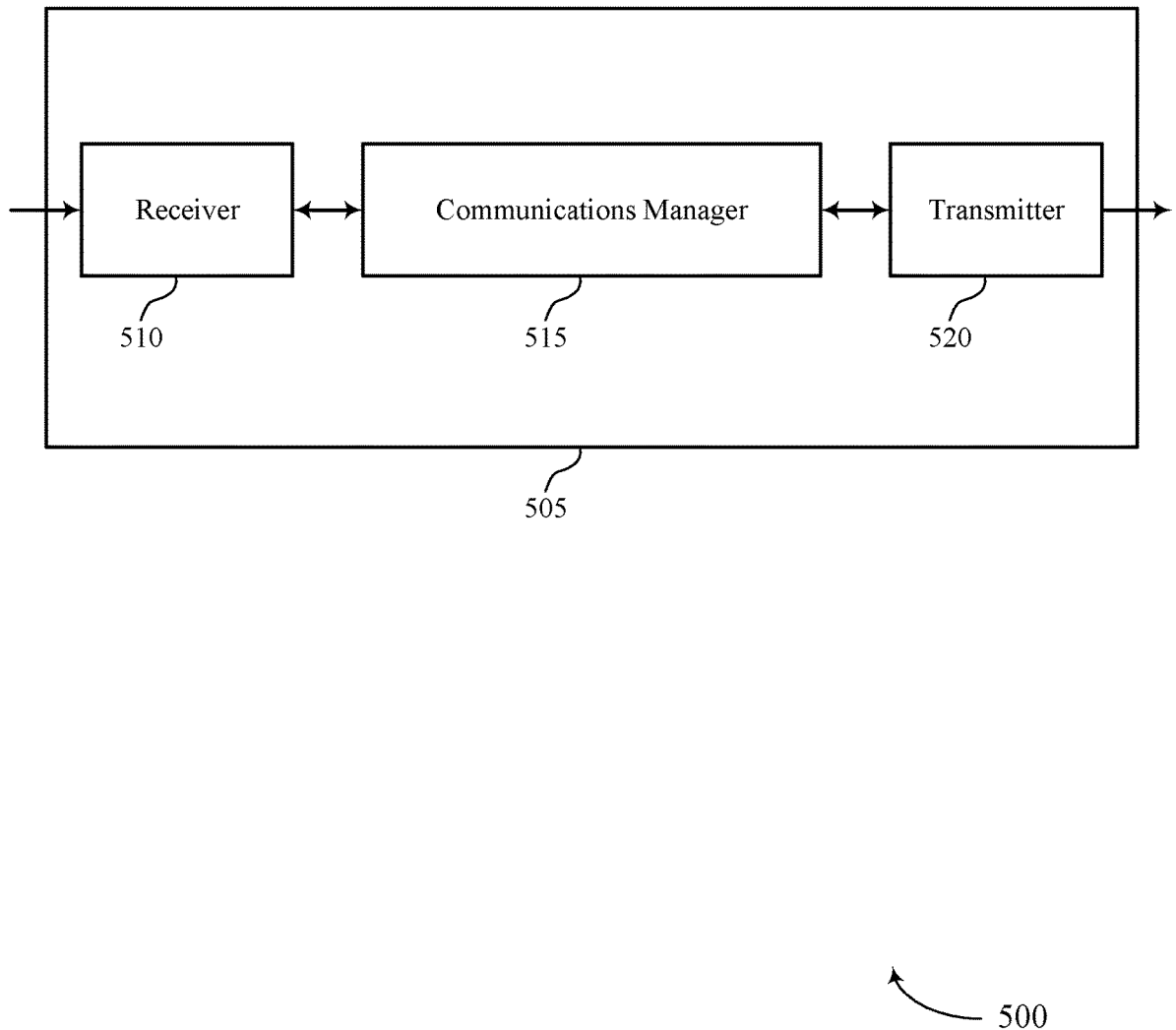
FIGS. 5 and 6 show block diagrams of devices that support cooperative event warning system in accordance with one or more aspects of the present disclosure.

FIG. 5 shows a block diagram 500 of a device 505 that supports a cooperative event warning system in accordance with one or more aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to cooperative event warning system, etc.). Information may be passed on to other components of the device 505. The receiver 510 may be an example of aspects of the transceiver 820 described with reference to FIG. 8. The receiver 510 may utilize a single antenna or a set of antennas.

In a first example, the communications manager 515 may receive, at a first wireless device, situational information for a second wireless device over a first communication link between the first wireless device and the second wireless device at a first wireless device and situational information for a third wireless device over a second communication link between the first wireless device and the third wireless device, and transmit a message including guidance information to the second wireless device on behalf of the third wireless device and based at least in part on the second wireless and the third wireless device having an event likelihood above a threshold, where the event likelihood is based at least in part on the situational information for the second wireless device and the situational information for the third wireless device. The communications manager 515 may be an example of aspects of the communications manager 810 described herein.

In a second example, the communications manager 515 may transmit, by a first wireless device, situational information for the first wireless device to a second wireless device over a communication link between the first wireless device and the second wireless device, receive, from the second wireless device over the communication link, a message including guidance information that indicates the first wireless device and a third wireless device have an event likelihood above a threshold, and output a signal to prompt a change in behavior based at least in part on the guidance information.

In a third example, the communications manager 515 may receive at a first wireless device, situational information for a second wireless device from a third wireless device, and transmit a message including guidance information to the second wireless device based at least in part on the first wireless and the second wireless device having an event likelihood above the threshold, the event likelihood based at least in part on a route of the second wireless device, the route of the second wireless device based at least in part on the situational information for the second wireless device.

In a fourth example, the communications manager 515 may receive, at a first wireless device, surroundings information from a second wireless device over a link between the first wireless device and the second wireless device, and transmit a message including guidance information to a third wireless device based at least in part on the third wireless device having an event likelihood above a threshold, where the event likelihood is based at least in part on the surroundings information from the second device.

The communications manager 515 may be an example of means for performing various aspects of a cooperative warning system as described herein. The communications manager 515, or its sub-components, may be implemented in hardware (e.g., in communications management circuitry). The circuitry may comprise a processor, a digital signal processor (DSP), an application-specific integrated circuit (ASIC), a field programmable gate array (FPGA), or other programmable logic device, discrete gate or transistor logic, discrete hardware components, or any combination thereof designed to perform the functions described in the present disclosure.

In another implementation, the communications manager 515, or its sub-components, may be implemented in code (e.g., as communications management software or firmware) executed by a processor, or any combination thereof. If implemented in code executed by a processor, the functions of the communications manager 515, or its sub-components may be executed by a general-purpose processor, a DSP, an ASIC, an FPGA, or other programmable logic device.

In some examples, the communications manager 515 may be configured to perform various operations (e.g., receiving, determining, transmitting) using or otherwise in cooperation with the receiver 510, the transmitter 520, or both.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The communications manager 515 may as described herein be implemented to realize one or more potential advantages. One implementation may allow the device 505 to provide collision avoidance information to a VRU UE, which may conserve processing resources at the VRU UE. Further, implementations may allow the device 505 to utilize processing resources more efficiently, among other advantages.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
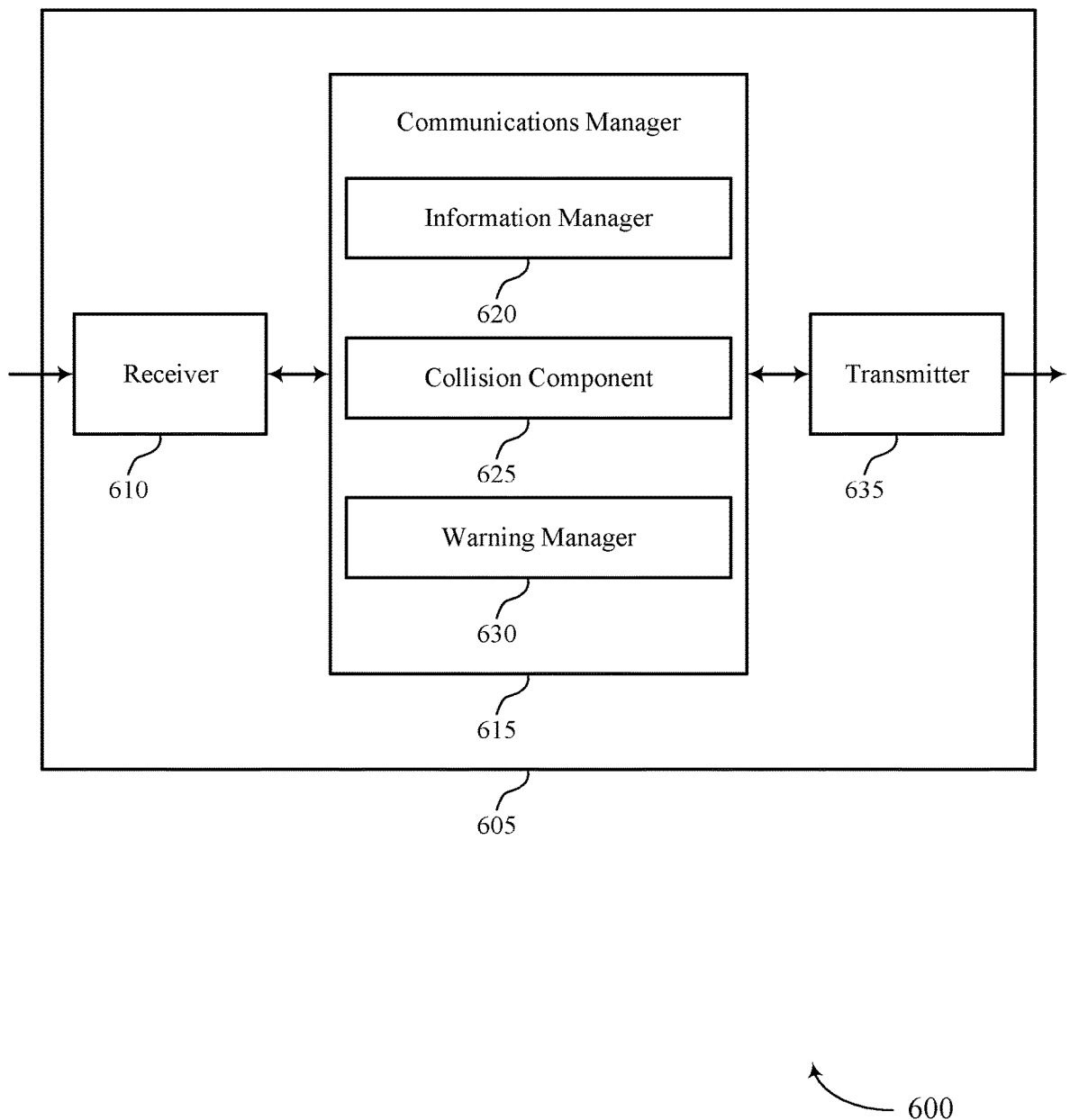

FIG. 6 shows a block diagram 600 of a device 605 that supports a cooperative event warning system in accordance with one or more aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to cooperative event warning system, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include an information manager 620, a collision component 625, and a warning manager 630. The communications manager 615 may be an example of aspects of the communications manager 810 described herein.

In a first example, the information manager 620 may receive, at a first wireless device, situational information for a second wireless device over a first communication link between the first wireless device and the second wireless device and situational information for a third wireless device over a second communication link between the first wireless device and the third wireless device. The warning manager 630 may transmit a message including guidance information to the second wireless device on behalf of the third wireless device and based at least in part on the second wireless and the third wireless device having an event likelihood above a threshold, where the event likelihood is based at least in part on the situational information for the second wireless device and the situational information for the third wireless device.

In a second example, the information manager 620 may transmit, by a first wireless device, situational information for the first wireless device to a second wireless device over a communication link between the first wireless device and the second wireless device. The warning manager 630 may receive, from the second wireless device over the communication link, a message including guidance information that indicates the first wireless device and a third wireless device have an event likelihood above a threshold. The collision component 625 may a signal to prompt a change in behavior based at least in part on the guidance information.

In a third example, the information manager 620 may receive, at a first wireless device, situational information for a second wireless device from a third wireless device. The warning manager 630 may transmit a message including guidance information to the second wireless device based at least in part on the first wireless and the second wireless device having an event likelihood above the threshold, the event likelihood based at least in part on a route of the second wireless device, the route of the second wireless device based at least in part on the situational information for the second wireless device.

In a fourth example, the information manager 620 may receive, at a first wireless device, surroundings information from a second wireless device over a link between the first wireless device and the second wireless device. The warning manager 630 may transmit a message including guidance information to a third wireless device based at least in part on the third wireless device having an event likelihood above a threshold, where the event likelihood is based at least in part on the surroundings information from the second device.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
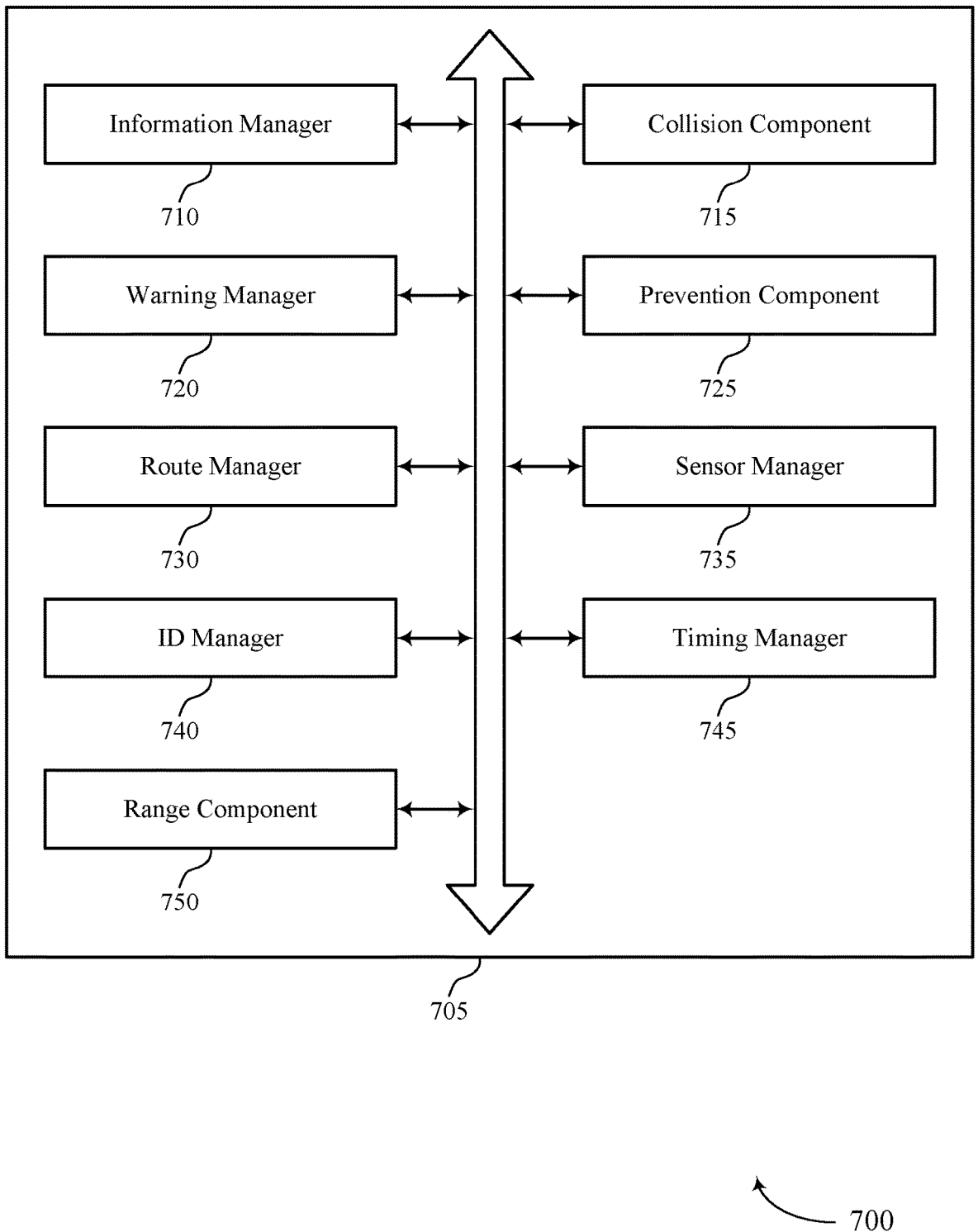
FIG. 7 shows a block diagram of a communications manager that supports a cooperative event warning system in accordance with one or more aspects of the present disclosure.

FIG. 7 shows a block diagram 700 of a communications manager 705 that supports a cooperative event warning system in accordance with one or more aspects of the present disclosure. The communications manager 705 may be an example of aspects of a communications manager 515, a communications manager 615, or a communications manager 810 described herein. The communications manager 705 may include an information manager 710, a collision component 715, a warning manager 720, a prevention component 725, a route manager 730, a sensor manager 735, an ID manager 740, a timing manager 745, and a range component 750. Each of these modules may communicate, directly or indirectly, with one another (e.g., via one or more buses).

In a first example, the information manager 710 may receive, at a first wireless device, situational information for a second wireless device over a first communication link between the first wireless device and the second wireless device and situational information for a third wireless device over a second communication link between the first wireless device and the third wireless device. The warning manager 720 may transmit a message including guidance information to the second wireless device on behalf of the third wireless device and based at least in part on the second wireless and the third wireless device having an event likelihood above a threshold, where the event likelihood is based at least in part on the situational information for the second wireless device and the situational information for the third wireless device.

In some examples, the situational information (and/or the guidance information) indicates a yaw, a pitch, a roll angle, a position, a velocity, a direction, an acceleration, a change in yaw, a change in roll angle, a change in position, a change in velocity, a change in direction, a change in acceleration, or a combination thereof. For example, the situational information may indicate a position, a velocity, and/or an acceleration in one or more directions (e.g., the x direction, y direction, and/or z direction with respect to a three-dimensional rectangular coordinate system). In a three-dimensional coordinate system, yaw may refer to rotation or movement around the z-axis, pitch may refer to rotation or movement around the y-axis, and roll angle may refer to rotation or movement around the x-axis.

In some examples, the event likelihood is a collision likelihood. In some examples, the guidance information includes an indication of a possible collision, an indication of an action to avoid a possible collision, or a combination thereof.

In some cases, the first wireless device and the second wireless device are moving asynchronously or have a difference in velocity greater than a threshold velocity. In some examples, the collision component 715 may determine that the first wireless device is on a collision-free course with respect to the second wireless device, where the guidance information is transmitted after determining that the first wireless device is on the collision-free course.

In some examples, the warning manager 720 may determine a period of time during which the guidance information is applicable, where the guidance information includes an indication of the period of time. In some examples, the warning manager 720 may transmit a second message including guidance information to the third wireless device based on determining that the second wireless and the third wireless device have a collision likelihood above the threshold. In some cases, the guidance information includes an indication of a direction for the third wireless device to avoid, a duration of time for the direction to be avoided, an adjustment to a velocity of the third wireless device, an adjustment to a heading angle of the third wireless device, situational information for the second wireless device, or a combination thereof.

The prevention component 725 may determine a behavior associated with position, velocity, direction, or a combination thereof that will prevent collision between the second and third wireless devices, where the guidance information includes an indication of the behavior. In some examples, the prevention component 725 may transmit an indication of the behavior to the third wireless device. In some examples, the prevention component 725 may determine a direction for the second wireless device to avoid for a duration of time, where the guidance information includes an indication of the direction and the duration of time. In some examples, the prevention component 725 may determine an adjustment to a velocity of the second wireless device, where the guidance information includes an indication of the adjustment. In some examples, the prevention component 725 may determine an adjustment to a heading angle of the second wireless device, where the guidance information includes an indication of the adjustment.

The route manager 730 may determine a route for the second wireless device to take to prevent a collision with the third wireless device based on the situational information for the second and third wireless devices, where the guidance information includes an indication of the route. In some examples, route manager 730 may determine a route of the third wireless device based on the situational information for the third wireless device, where the guidance information includes an indication of the route.

The sensor manager 735 may monitor the second wireless device using at least one sensor coupled with the first wireless device, where determining that the second wireless device and the third wireless device have a collision likelihood above the threshold is based on the monitoring.

The ID manager 740 may determine an identifier of the second wireless device. In some examples, the ID manager 740 may transmit an indication of the identifier to the third wireless device.

The timing manager 745 may receive from the second wireless device an indication of a period of time the second wireless device is able to receive communications. In some examples, the warning manager 720 may transmit the guidance information to the second wireless device during the period of time.

The range component 750 may determine that the second wireless device is unaware of the third wireless device, where the guidance information is transmitted based on determining that the second wireless device is unaware of the third wireless device. In some examples, the range component 750 may determine that the second wireless device is out of communication range with the third wireless device.

In a second example, the information manager 710 may transmit, by a first wireless device, situational information for the first wireless device to a second wireless device over a communication link between the first wireless device and the second wireless device. The warning manager 720 may receive, from the second wireless device over the communication link, a message including guidance information that indicates the first wireless device and a third wireless device have an event likelihood above a threshold. The collision component 715 may output a signal to prompt a change in behavior based at least in part on the guidance information. In some examples, the signal is a visual, auditory, or tactile signal detectable by a human. On some examples, the signal is an electrical signal detectable by an electronic device.

In some examples, the situational information indicates position, velocity, direction, or a combination thereof. In some examples, the change in behavior comprises a change in yaw, a change in pitch, a change in roll angle, a change in velocity, a change in direction, a change in acceleration, outputting an alert signal, or a combination thereof. In some examples, the signal is communicated to a vehicle coupled with the first wireless device, a person coupled with the first wireless device, the second wireless device, the third wireless device, or a combination thereof. In some examples, the change in behavior comprises a change by the vehicle coupled with the first wireless device, a change by the person coupled with the first wireless device, a change by the second wireless device, a change by the third wireless device, or a combination thereof.

In some examples, the guidance information includes a direction for the first wireless device to avoid for a duration of time, an adjustment to a heading angle of the second wireless device, an adjustment to a velocity of the second wireless device, situational information for the third wireless device, or a combination thereof.

In some examples, the collision component 715 may determine that a fourth wireless device within a threshold distance of the first wireless device is traveling in a same direction or to a same destination as the first wireless device. In such examples, the warning manager 720 may transmit the guidance information to the fourth wireless device.

In some examples, the ID manager 740 may receive from the second wireless device an indication of an identifier of the third wireless device. In such examples, the ID manager 740 may communicate with the third wireless device about the collision likelihood based at least in part on the identifier. In some examples, the guidance information is received while the first wireless device is out of communication range with the third wireless device. In such examples, the range component 750 may determine that the first wireless device is in communication range of the third wireless device, where communicating with the third wireless device is based at least in part on determining that the first wireless device is in communication range of the third wireless device.

In a third example, the information manager 710 may receive, at a first wireless device, situational information for a second wireless device from a third wireless device. The warning manager 720 may transmit a message including guidance information to the second wireless device based at least in part on the first wireless and the second wireless device having an event likelihood above the threshold, the event likelihood based at least in part on a route of the second wireless device, the route of the second wireless device based at least in part on the situational information for the second wireless device. In some examples, the situational information includes a location of the second wireless device within an image frame, one or more coordinates of the second wireless device, a heading angle of the second wireless device, a body position of a user of the second wireless device, or a combination thereof.

In some examples, the sensor manager 735 may determine additional situational information for the second wireless device based at least in part on information from one or more sensors coupled with the first wireless device, where the collision likelihood is determined based at least in part on the additional situational information for the second wireless device. In some examples, the warning manager 720 may transmit the additional situational information for the second wireless device to the third wireless device, where the route of the second wireless device is determined cooperatively with the third wireless device.

In some examples, the information manager 710 may receive additional situational information for the second wireless device from the second wireless device, where the route of the second wireless device is determined based at least in part on the additional situational information for the second wireless device.

In a fourth example, the information manager 710 may receive, at a first wireless device, surroundings information from a second wireless device over a link between the first wireless device and the second wireless device. The warning manager 720 may transmit a message including guidance information to a third wireless device based at least in part on the third wireless device having an event likelihood above a threshold, where the event likelihood is based at least in part on the surroundings information from the second device.

In some examples, the surroundings information indicates an object, a road condition, or a combination thereof. In some examples, the event likelihood is the likelihood that the second wireless device passes within a threshold distance of an object or road condition. In some examples, the guidance information indicates a location of an object, a location of a road condition, or a combination thereof. In some examples, the guidance information indicates one or more actions the second device can take to reduce the event likelihood.

Figure 8:
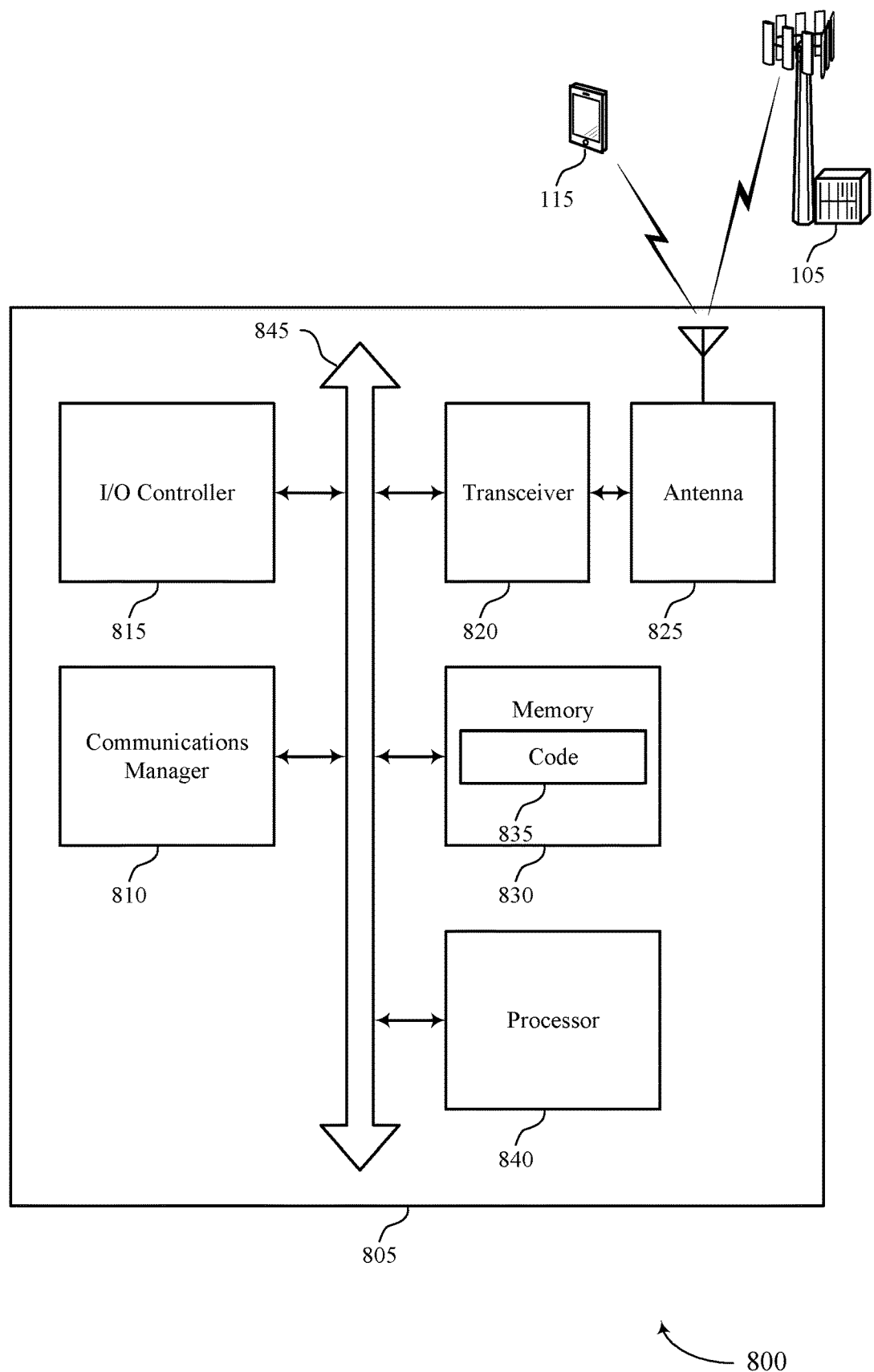
FIG. 8 shows a diagram of a system including a device that supports a cooperative event warning system in accordance with one or more aspects of the present disclosure.

FIG. 8 shows a diagram of a system 800 including a device 805 that supports a cooperative event warning system in accordance with one or more aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

In a first example, the communications manager 810 may receive, at a first wireless device, situational information for a second wireless device over a first communication link between the first wireless device and the second wireless device and situational information for a third wireless device over a second communication link between the first wireless device and the third wireless device, and transmit a message including guidance information to the second wireless device on behalf of the third wireless device and based at least in part on the second wireless device and the third wireless device having an event likelihood above a threshold, where the event likelihood is based at least in part on the situational information for the second wireless device and the situational information for the third wireless device.

In a second example, the communications manager 810 may transmit, by a first wireless device, situational information for the first wireless device to a second wireless device over a communication link between the first wireless device and the second wireless device, receive, from the second wireless device over the communication link, a message including guidance information that indicates the first wireless device and a third wireless device have an event likelihood above a threshold, and output a signal to prompt a change in behavior based at least in part on the guidance information.

In a third example, the communications manager 810 may receive, at a first wireless device, situational information for a second wireless device from a third wireless device, and transmit a message including guidance information to the second wireless device based at least in part on the first wireless and the second wireless device having an event likelihood above the threshold, the event likelihood based at least in part on a route of the second wireless device, the route of the second wireless device based at least in part on the situational information for the second wireless device.

In a fourth example, the communications manager 810 may receive, at a first wireless device, surroundings information from a second wireless device over a link between the first wireless device and the second wireless device, and transmit a message including guidance information to a third wireless device based at least in part on the third wireless device having an event likelihood above a threshold, where the event likelihood is based at least in part on the surroundings information from the second device.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input-output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting cooperative event warning system).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
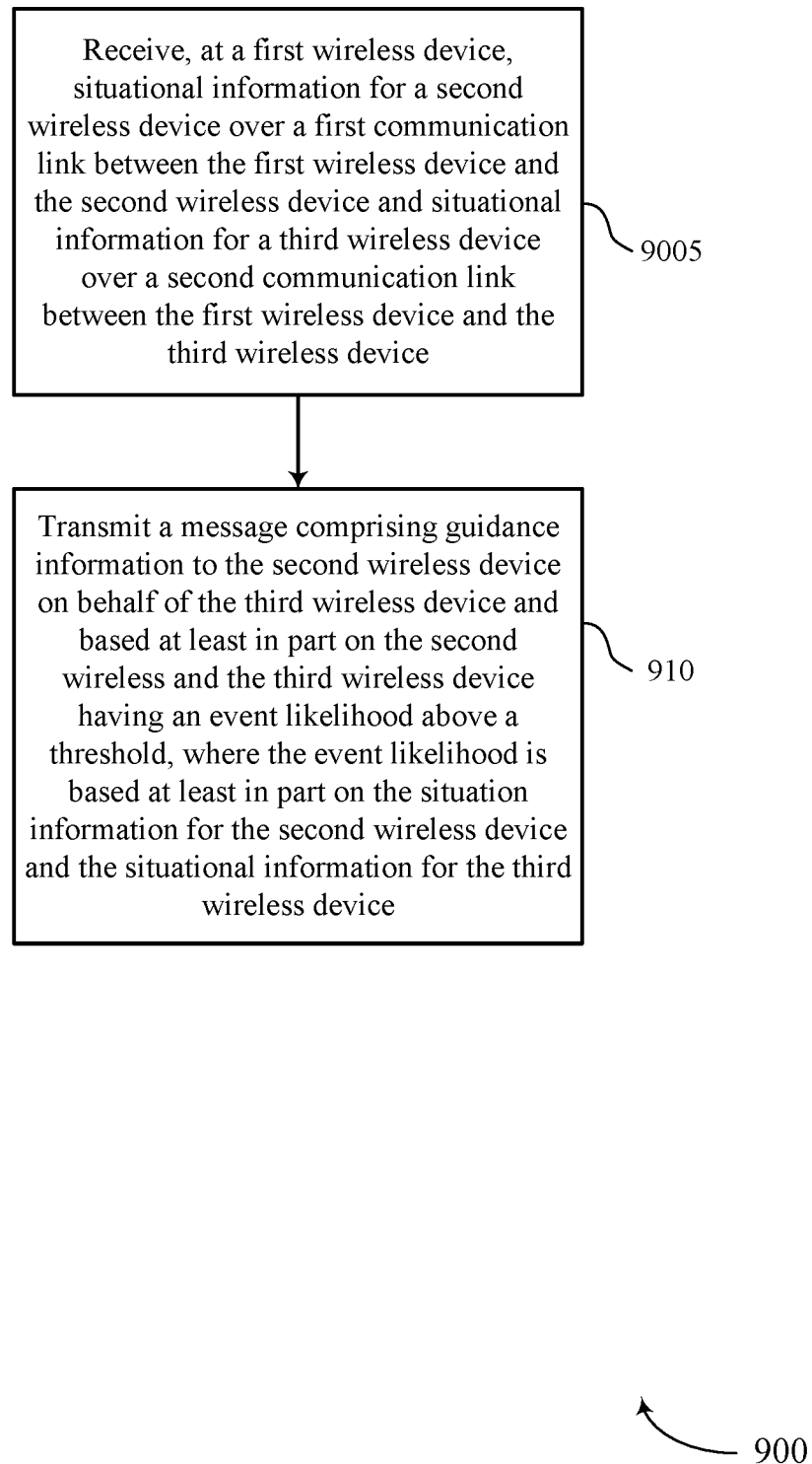
FIGS. 9-15 show flowcharts illustrating methods that support a cooperative event warning system in accordance with one or more aspects of the present disclosure.

FIG. 9 shows a flowchart illustrating a method 900 that supports a cooperative event warning system in accordance with one or more aspects of the present disclosure. The operations of method 900 may be implemented by a UE 115 or its components as described herein. For example, the operations of method 900 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 905, the method may include receiving, at a first wireless device, situational information for a second wireless device over a first communication link between the first wireless device and the second wireless device and situational information for a third wireless device over a second communication link between the first wireless device and the third wireless device. The operations of 905 may be performed according to the methods described herein. In some examples, aspects of the operations of 905 may be performed by an information manager as described with reference to FIGS. 6 and 7.

At 910, the method may include transmitting a message including guidance information to the second wireless device on behalf of the third wireless device and based at least in part on the second wireless device and the third wireless device having an event likelihood above a threshold, where the event likelihood is based at least in part on the situational information for the second wireless device and the situational information for the third wireless device. The operations of 910 may be performed according to the methods described herein. In some examples, aspects of the operations of 910 may be performed by a warning manager as described with reference to FIGS. 6 and 7.

Figure 10:
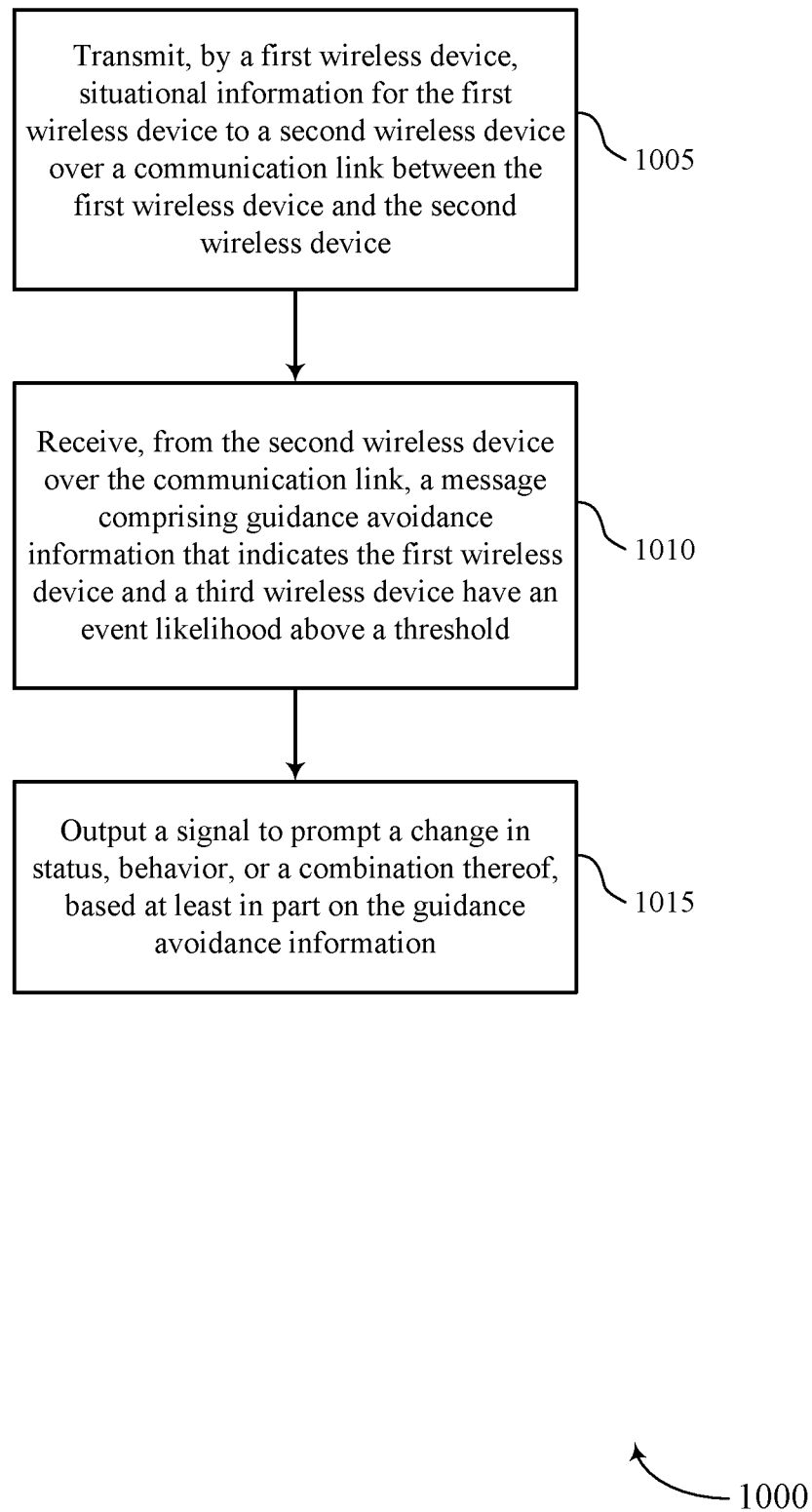

FIG. 10 shows a flowchart illustrating a method 1000 that supports a cooperative event warning system in accordance with one or more aspects of the present disclosure. The operations of method 1000 may be implemented by a UE 115 or its components as described herein. For example, the operations of method 1000 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1005, the method may include transmitting, by a first wireless device, situational information for the first wireless device to a second wireless device over a communication link between the first wireless device and the second wireless device. The operations of 1005 may be performed according to the methods described herein. In some examples, aspects of the operations of 1005 may be performed by an information manager as described with reference to FIGS. 6 and 7.

At 1010, the method may include receiving, from the second wireless device over the communication link, a message including guidance information that indicates the first wireless device and a third wireless device have an event likelihood above a threshold. The operations of 1010 may be performed according to the methods described herein. In some examples, aspects of the operations of 1010 may be performed by a warning manager as described with reference to FIGS. 6 and 7.

At 1015, the method may include outputting a signal to prompt a change in behavior based at least in part on the guidance information. The operations of 1015 may be performed according to the methods described herein. In some examples, aspects of the operations of 1015 may be performed by a collision component as described with reference to FIGS. 6 and 7.

Figure 11:
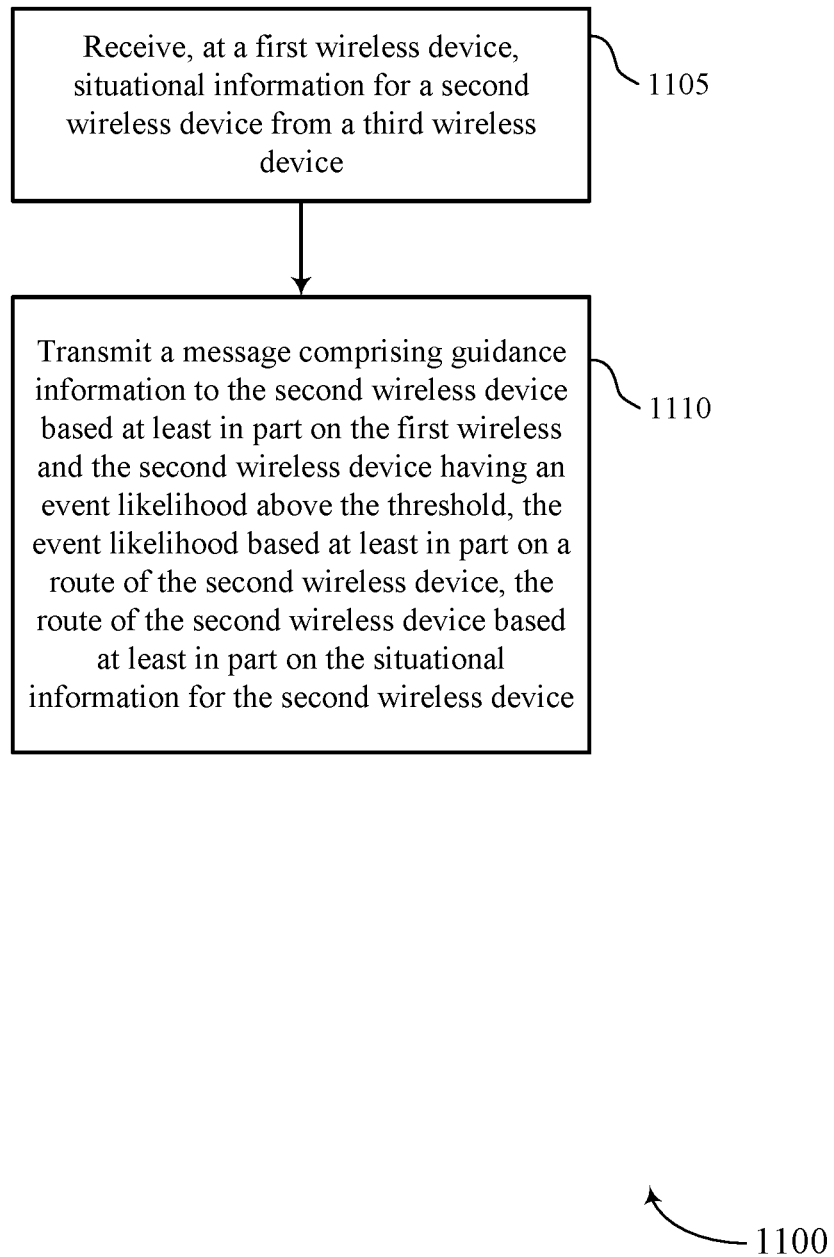

FIG. 11 shows a flowchart illustrating a method 1100 that supports a cooperative event warning system in accordance with one or more aspects of the present disclosure. The operations of method 1100 may be implemented by a UE 115 or its components as described herein. For example, the operations of method 1100 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1105, the method may include receiving, at a first wireless device, situational information for a second wireless device from a third wireless device. The operations of 1105 may be performed according to the methods described herein. In some examples, aspects of the operations of 1105 may be performed by an information manager as described with reference to FIGS. 6 and 7.

At 1110, the method may include transmitting a message including guidance information to the second wireless device based at least in part on the first wireless and the second wireless device having an event likelihood above the threshold, the event likelihood based at least in part on a route of the second wireless device, the route of the second wireless device based at least in part on the situational information for the second wireless device. The operations of 1110 may be performed according to the methods described herein. In some examples, aspects of the operations of 1110 may be performed by a warning manager as described with reference to FIGS. 6 and 7.

Figure 12:
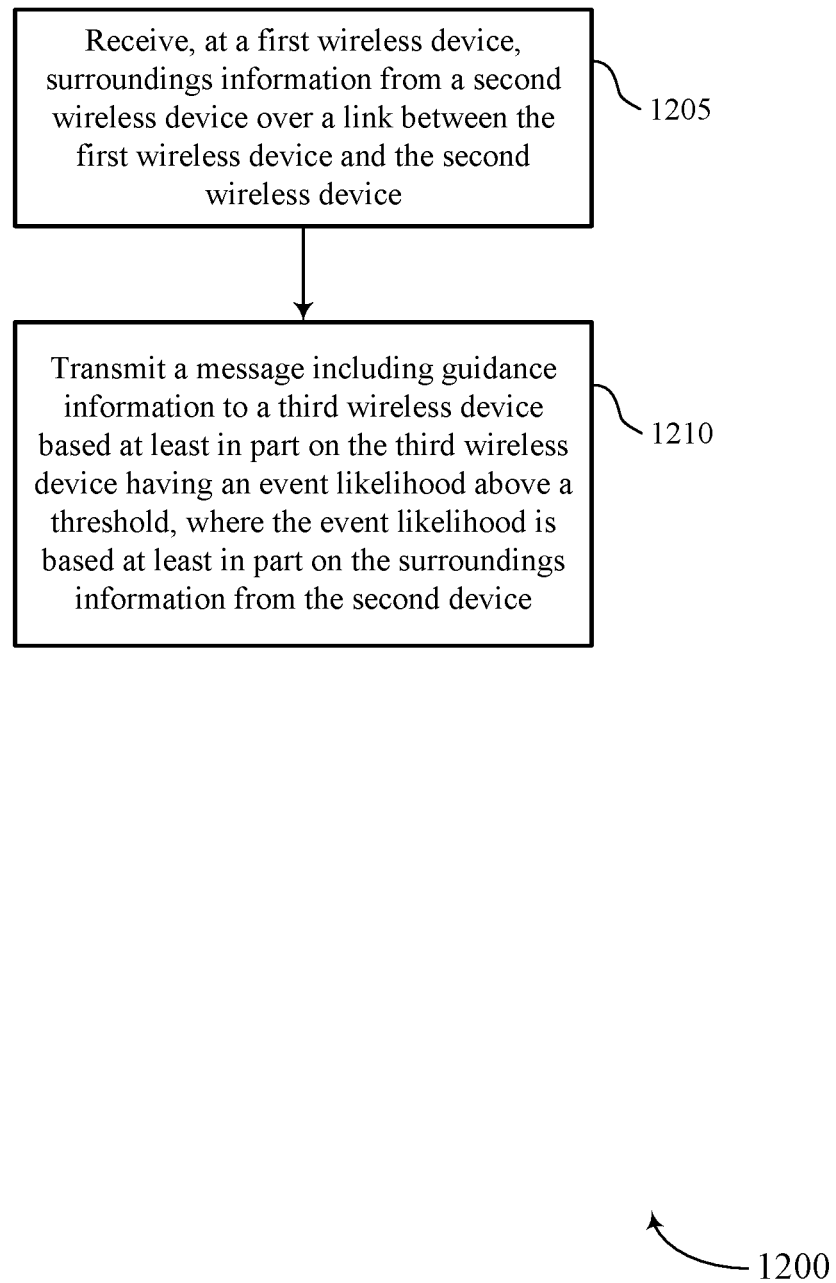

FIG. 12 shows a flowchart illustrating a method 1200 that supports a cooperative event warning system in accordance with one or more aspects of the present disclosure. The operations of method 1200 may be implemented by a UE 115 or its components as described herein. For example, the operations of method 1200 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1205, the method may include receiving, at a first wireless device, surroundings information from a second wireless device over a link between the first wireless device and the second wireless device. The operations of 1205 may be performed according to the methods described herein. In some examples, aspects of the operations of 1205 may be performed by an information manager as described with reference to FIGS. 6 and 7.

At 1210, the method may include transmitting a message including guidance information to a third wireless device based at least in part on the third wireless device having an event likelihood above a threshold, where the event likelihood is based at least in part on the surroundings information from the second device. The operations of 1210 may be performed according to the methods described herein. In some examples, aspects of the operations of 1210 may be performed by a warning manager as described with reference to FIGS. 6 and 7.

Figure 13:
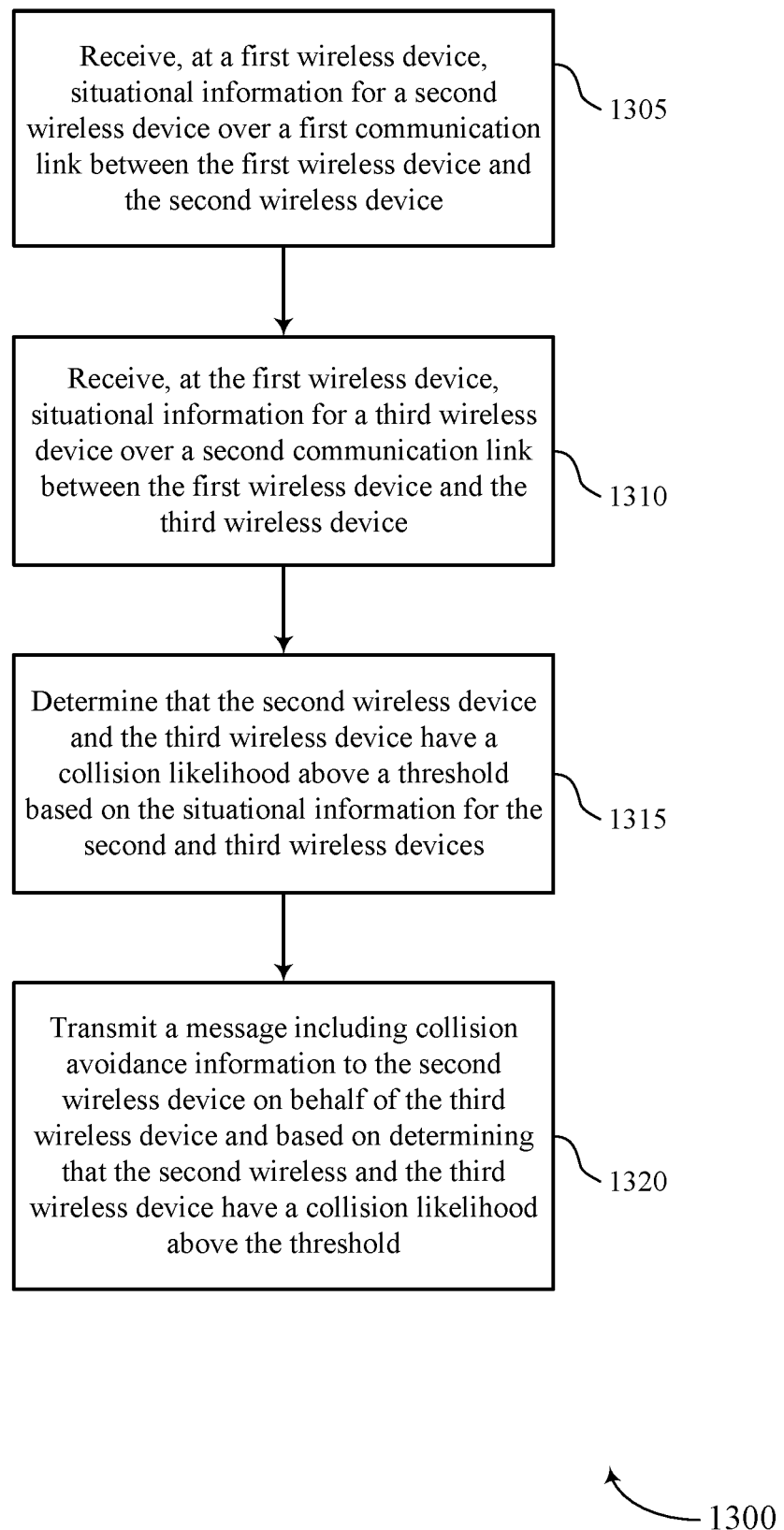

FIG. 13 shows a flowchart illustrating a method 1300 that supports a cooperative collision warning system in accordance with one or more aspects of the present disclosure. The operations of method 1300 may be implemented by a UE 115 or its components as described herein. For example, the operations of method 1300 may be performed by a communications manager as described with reference to FIGS. 6 and 7. In some examples, a UE may execute a set of instructions to control the functional elements of the UE to perform the functions described below. Additionally or alternatively, a UE may perform aspects of the functions described below using special-purpose hardware.

At 1305, the method may include receiving, at a first wireless device, situational information for a second wireless device over a first communication link between the first wireless device and the second wireless device, where the situational information indicates position, velocity, direction, or a combination thereof. The operations of 1305 may be performed according to the methods described herein. In some examples, aspects of the operations of 1305 may be performed by an information manager as described with reference to FIGS. 6 and 7.

At 1310, the method may include receiving, at the first wireless device, situational information for a third wireless device over a second communication link between the first wireless device and the third wireless device. The operations of 1310 may be performed according to the methods described herein. In some examples, aspects of the operations of 1310 may be performed by an information manager as described with reference to FIGS. 6 and 7.

At 1315, the method may include determining that the second wireless device and the third wireless device have a collision likelihood above a threshold based on the situational information for the second and third wireless devices. The operations of 1315 may be performed according to the methods described herein. In some examples, aspects of the operations of 1315 may be performed by a collision component as described with reference to FIGS. 6 and 7.

At 1320, the method may include transmitting a message including collision avoidance information to the second wireless device on behalf of the third wireless device and based on determining that the second wireless and the third wireless device have a collision likelihood above the threshold. The operations of 1320 may be performed according to the methods described herein. In some examples, aspects of the operations of 1320 may be performed by a warning manager as described with reference to FIGS. 6 and 7.

Figure 14:
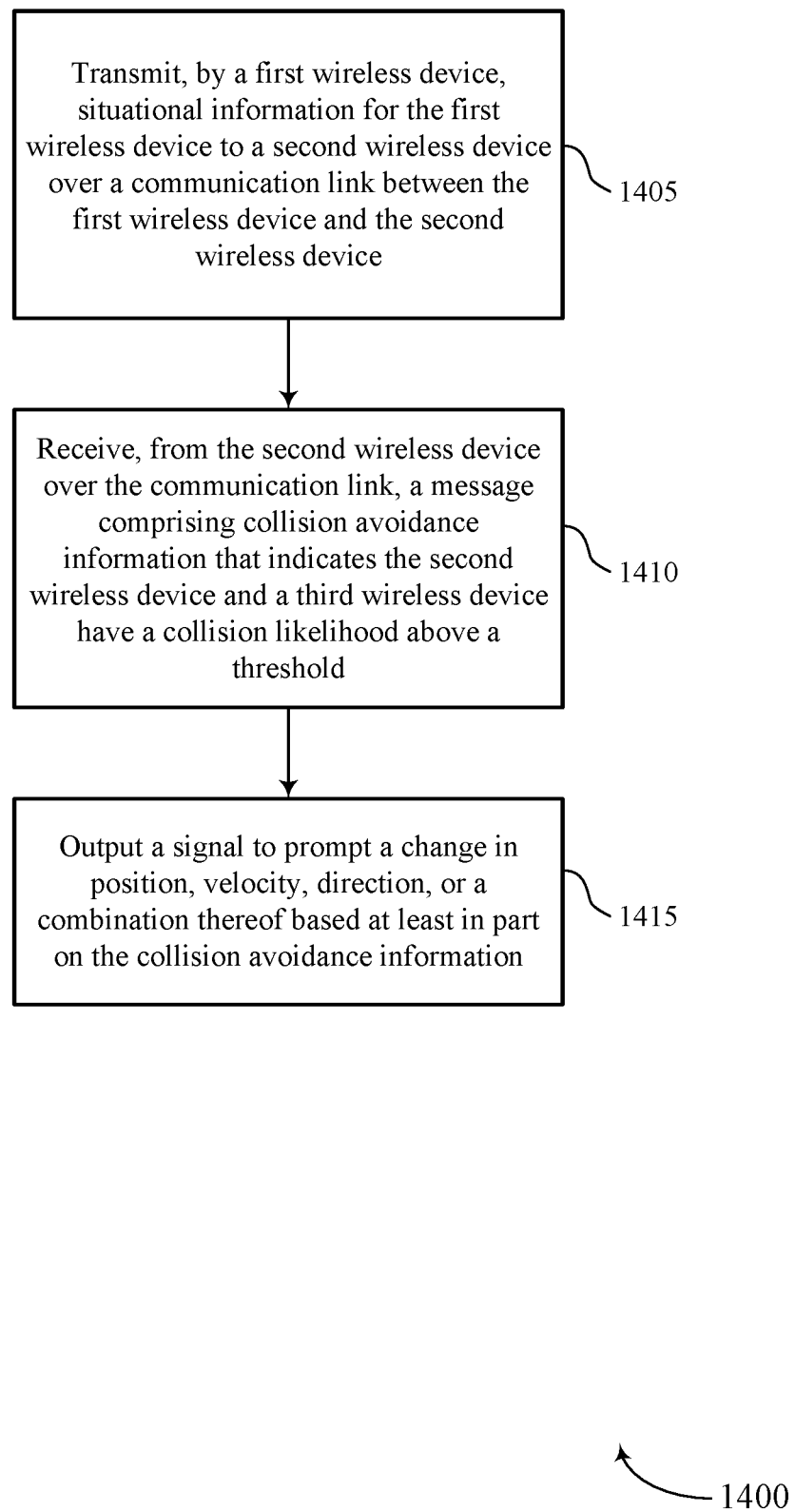

FIG. 14 shows a flowchart illustrating a method 1400 that supports a cooperative collision warning system in accordance with one or more aspects of the present disclosure. The operations of method 1400 may be implemented by a UE 115 or its components as described herein. For example, the operations of method 1400 may be performed by a communications manager as described with reference to FIGS. 6 and 7. In some examples, a UE may execute a set of instructions to control the functional elements of the UE to perform the functions described below. Additionally or alternatively, a UE may perform aspects of the functions described below using special-purpose hardware.

At 1405, the method may include transmitting, by a first wireless device, situational information for the first wireless device to a second wireless device over a communication link between the first wireless device and the second wireless device, where the situational information indicates position, velocity, direction, or a combination thereof. The operations of 1405 may be performed according to the methods described herein. In some examples, aspects of the operations of 1405 may be performed by an information manager as described with reference to FIGS. 6 and 7.

At 1410, the method may include receiving, from the second wireless device over the communication link, a message including collision avoidance information that indicates the second wireless device and a third wireless device have a collision likelihood above a threshold. The operations of 1410 may be performed according to the methods described herein. In some examples, aspects of the operations of 1410 may be performed by a warning manager as described with reference to FIGS. 6 and 7.

At 1415, the method may include outputting a signal to prompt a change in position, velocity, direction, or a combination thereof based at least in part on the collision avoidance information. The operations of 1415 may be performed according to the methods described herein. In some examples, aspects of the operations of 1415 may be performed by a collision component as described with reference to FIGS. 6 and 7.

Figure 15:
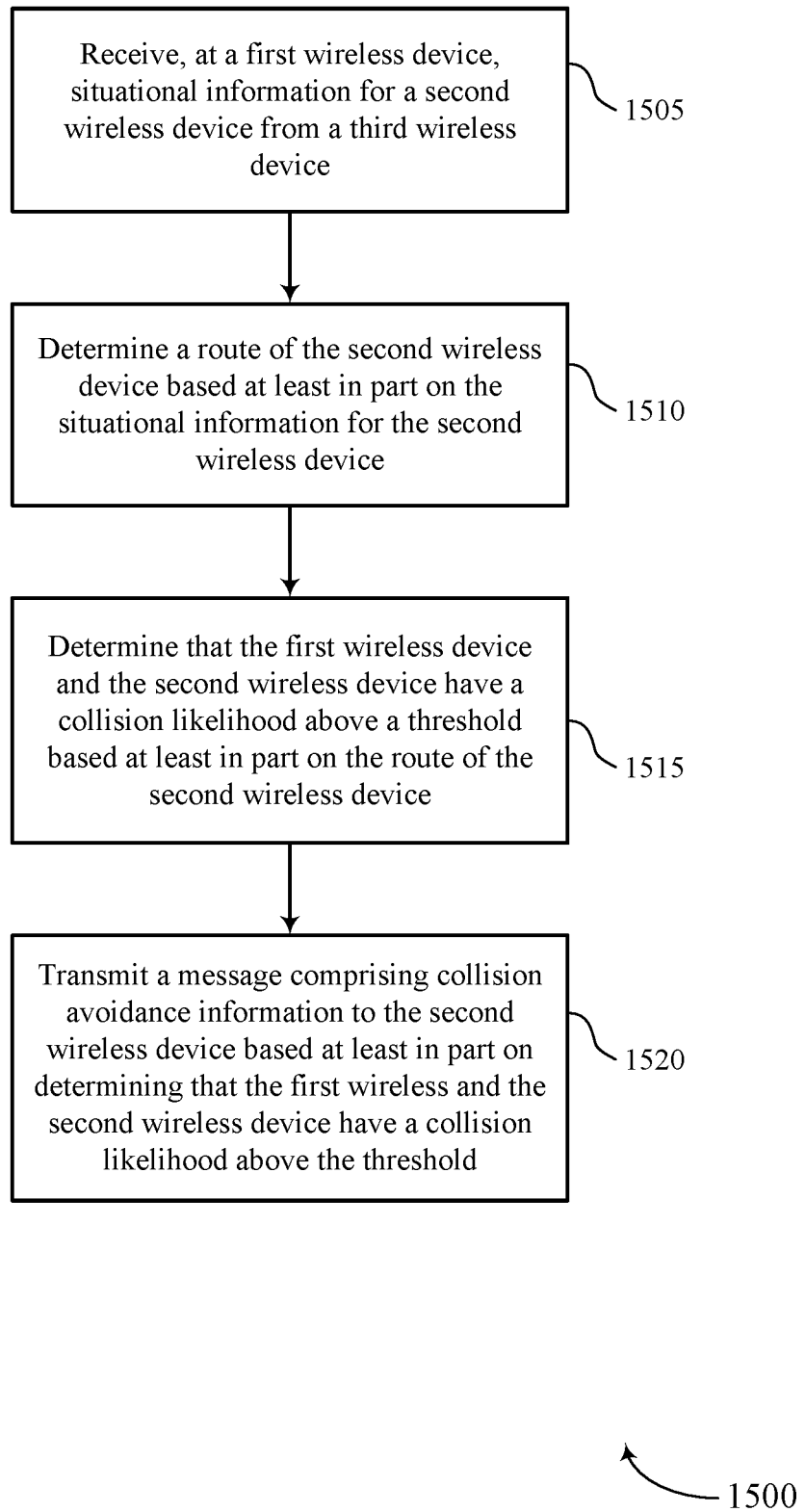

FIG. 15 shows a flowchart illustrating a method 1500 that supports a cooperative collision warning system in accordance with one or more aspects of the present disclosure. The operations of method 1500 may be implemented by a UE 115 or its components as described herein. For example, the operations of method 1500 may be performed by a communications manager as described with reference to FIGS. 6 and 7. In some examples, a UE may execute a set of instructions to control the functional elements of the UE to perform the functions described below. Additionally or alternatively, a UE may perform aspects of the functions described below using special-purpose hardware.

At 1505, the method may include receiving, at a first wireless device, situational information for a second wireless device from a third wireless device, where the situational information indicates position, velocity, direction, or a combination thereof. The operations of 1505 may be performed according to the methods described herein. In some examples, aspects of the operations of 1505 may be performed by an information manager as described with reference to FIGS. 6 and 7.

At 1510, the method may include determining a route of the second wireless device based at least in part on the situational information for the second wireless device. The operations of 1510 may be performed according to the methods described herein. In some examples, aspects of the operations of 1510 may be performed by a route manager as described with reference to FIG. 7.

At 1515, the method may include determining that the first wireless device and the second wireless device have a collision likelihood above a threshold based at least in part on the route of the second wireless device. The operations of 1515 may be performed according to the methods described herein. In some examples, aspects of the operations of 1515 may be performed by a collision component as described with reference to FIGS. 6 and 7.

At 1520, the method may include transmitting a message including collision avoidance information to the second wireless device based at least in part on determining that the first wireless and the second wireless device have a collision likelihood above the threshold. The operations of 1520 may be performed according to the methods described herein. In some examples, aspects of the operations of 1520 may be performed by a warning manager as described with reference to FIGS. 6 and 7.

It should be noted that the methods described herein describe possible implementations, and that the operations may be rearranged or otherwise modified and that other implementations are possible. Further, aspects from two or more of the methods may be combined.

The following provides an overview of aspects of the present disclosure:

Aspect 1: A method for wireless communication, comprising: receiving, at a first wireless device, situational information for a second wireless device over a first communication link between the first wireless device and the second wireless device and situational information for a third wireless device over a second communication link between the first wireless device and the third wireless device; and transmitting a message comprising guidance information to the second wireless device on behalf of the third wireless device and based at least in part on the second wireless device and the third wireless device having an event likelihood above a threshold, wherein the event likelihood is based at least in part on the situational information for the second wireless device and the situational information for the third wireless device.

Aspect 2: The method of aspect 1, wherein the situational information indicates a yaw, a pitch, a roll angle, a position, a velocity, a direction, an acceleration, a change in yaw, a change in roll angle, a change in position, a change in velocity, a change in direction, a change in acceleration, or a combination thereof.

Aspect 3: The method of any of aspects 1 through 2, wherein the event likelihood comprises a collision likelihood.

Aspect 4: The method of any of aspects 1 through 3, wherein the guidance information comprises an indication of a possible collision, an indication of an action to avoid a possible collision, or a combination thereof.

Aspect 5: The method of any of aspects 1 through 4, further comprising: determining a direction for the second wireless device to avoid for a duration of time, wherein the guidance information comprises an indication of the direction and the duration of time; determining an adjustment to a velocity of the second wireless device, wherein the guidance information comprises an indication of the adjustment; or determining an adjustment to a heading angle of the second wireless device, wherein the guidance information comprises an indication of the adjustment.

Aspect 6: The method of any of aspects 1 through 5, further comprising: determining a route for the second wireless device to take to prevent a collision with the third wireless device based at least in part on the situational information for the second and third wireless devices, wherein the guidance information comprises an indication of the route.

Aspect 7: The method of any of aspects 1 through 6, further comprising: determining a route of the third wireless device based at least in part on the situational information for the third wireless device, wherein the guidance information comprises an indication of the route.

Aspect 8: The method of any of aspects 1 through 7, further comprising: transmitting a second message comprising guidance information to the third wireless device based at least in part on determining that the second wireless device and the third wireless device have an event likelihood above the threshold.

Aspect 9: The method of any of aspects 1 through 8, further comprising: receiving from the second wireless device an indication of a period of time the second wireless device is able to receive communications; and transmitting the guidance information to the second wireless device during the period of time.

Aspect 10: The method of any of aspects 1 through 9, further comprising: determining that the second wireless device is unaware of the third wireless device, wherein the guidance information is transmitted based at least in part on determining that the second wireless device is unaware of the third wireless device.

Aspect 11: The method of any of aspects 1 through 10, further comprising: determining that the first wireless device is on a collision-free course with respect to the second wireless device, wherein the guidance information is transmitted after determining that the first wireless device is on the collision-free course.

Aspect 12: The method of any of aspects 1 through 11, wherein the first wireless device and the second wireless device are moving asynchronously or have a difference in velocity greater than a threshold velocity.

Aspect 13: A method for wireless communication, comprising: transmitting, by a first wireless device, situational information for the first wireless device to a second wireless device over a communication link between the first wireless device and the second wireless device; receiving, from the second wireless device over the communication link, a message comprising guidance information that indicates the first wireless device and a third wireless device have an event likelihood above a threshold; and outputting a signal to prompt a change in behavior based at least in part on the guidance information.

Aspect 14: The method of aspect 13, wherein the situational information indicates a yaw, a pitch, a roll angle, a position, a velocity, a direction, an acceleration, a change in yaw, a change in roll angle, a change in position, a change in velocity, a change in direction, a change in acceleration, or a combination thereof.

Aspect 15: The method of any of aspects 13 through 14, wherein the change in behavior comprises a change in yaw, a change in pitch, a change in roll angle, a change in velocity, a change in direction, a change in acceleration, outputting an alert signal, or a combination thereof.

Aspect 16: The method of any of aspects 13 through 15, wherein the signal is communicated to a vehicle coupled with the first wireless device, a person coupled with the first wireless device, the second wireless device, the third wireless device, or a combination thereof, and the change in behavior comprises a change by the vehicle coupled with the first wireless device, a change by the person coupled with the first wireless device, a change by the second wireless device, a change by the third wireless device, or a combination thereof.

Aspect 17: The method of any of aspects 13 through 16, wherein the guidance information comprises a direction for the first wireless device to avoid for a duration of time, an adjustment to a heading angle of the second wireless device, an adjustment to a velocity of the second wireless device, situational information for the third wireless device, or a combination thereof.

Aspect 18: The method of any of aspects 13 through 17, wherein the signal comprises a visual, auditory, or tactile signal detectable by a human or an electrical signal detectable by an electronic device.

Aspect 19: The method of any of aspects 13 through 18, further comprising: determining that a fourth wireless device within a threshold distance of the first wireless device is traveling in a same direction or to a same destination as the first wireless device; and transmitting the guidance information to the fourth wireless device.

Aspect 20: The method of any of aspects 13 through 19, wherein the guidance information is received while the first wireless device is out of communication range with the third wireless device, the method further comprising: determining that the first wireless device is in communication range of the third wireless device, wherein communicating with the third wireless device is based at least in part on determining that the first wireless device is in communication range of the third wireless device.

Aspect 21: A method for wireless communication, comprising: receiving, at a first wireless device, situational information for a second wireless device from a third wireless device; and transmitting a message comprising guidance information to the second wireless device based at least in part on the first wireless device and the second wireless device having an event likelihood above a threshold, wherein the event likelihood is based at least in part on a route of the second wireless device, and wherein the route of the second wireless device is based at least in part on the situational information for the second wireless device.

Aspect 22: The method of aspect 21, further comprising: determining additional situational information for the second wireless device based at least in part on information from one or more sensors coupled with the first wireless device, wherein the event likelihood is determined based at least in part on the additional situational information for the second wireless device.

Aspect 23: The method of aspect 22, further comprising: transmitting the additional situational information for the second wireless device to the third wireless device, wherein the route of the second wireless device is determined cooperatively with the third wireless device.

Aspect 24: The method of any of aspects 21 through 23, further comprising: receiving additional situational information for the second wireless device from the second wireless device, wherein the route of the second wireless device is determined based at least in part on the additional situational information for the second wireless device.

Aspect 25: The method of any of aspects 21 through 24, wherein the situational information comprises a location of the second wireless device within an image frame, one or more coordinates of the second wireless device, a heading angle of the second wireless device, a body position of a user of the second wireless device, or a combination thereof.

Aspect 26: A method for wireless communication, comprising: receiving, at a first wireless device, surroundings information from a second wireless device over a link between the first wireless device and the second wireless device; and transmitting a message comprising guidance information to a third wireless device based at least in part on the third wireless device having an event likelihood above a threshold, wherein the event likelihood is based at least in part on the surroundings information from the second wireless device.

Aspect 27: The method of aspect 26, wherein the surroundings information indicates an object, a road condition, or a combination thereof.

Aspect 28: The method aspect 26, wherein the event likelihood comprises a likelihood that the second wireless device passes within a threshold distance of an object or road condition.

Aspect 29: The method of any of aspects 26 through 28, wherein the guidance information indicates a location of an object, a location of a road condition, or a combination thereof.

Aspect 30: The method of any of aspects 26 through 29, wherein the guidance information indicates one or more actions the second wireless device can take to reduce the event likelihood.

Aspect 31: An apparatus for wireless communication, comprising a processor; and memory coupled to the processor, the processor and memory configured to perform a method of any of aspects 1 through 12.

Aspect 32: An apparatus for wireless communication, comprising at least one means for performing a method of any of aspects 1 through 12.

Aspect 33: A non-transitory computer-readable medium storing code for wireless communication, the code comprising instructions executable by a processor to perform a method of any of aspects 1 through 12.

Aspect 34: An apparatus for wireless communication, comprising a processor; and memory coupled to the processor, the processor and memory configured to perform a method of any of aspects 13 through 20.

Aspect 35: An apparatus for wireless communication, comprising at least one means for performing a method of any of aspects 13 through 20.

Aspect 36: A non-transitory computer-readable medium storing code for wireless communication, the code comprising instructions executable by a processor to perform a method of any of aspects 13 through 20.

Aspect 37: An apparatus for wireless communication, comprising a processor; and memory coupled to the processor, the processor and memory configured to perform a method of any of aspects 21 through 25.

Aspect 38: An apparatus for wireless communication, comprising at least one means for performing a method of any of aspects 21 through 25.

Aspect 39: A non-transitory computer-readable medium storing code for wireless communication, the code comprising instructions executable by a processor to perform a method of any of aspects 21 through 25.

Aspect 40: An apparatus for wireless communication, comprising a processor; and memory coupled to the processor, the processor and memory configured to perform a method of any of aspects 26 through 30.

Aspect 41: An apparatus for wireless communication, comprising at least one means for performing a method of any of aspects 26 through 30.

Aspect 42: A non-transitory computer-readable medium storing code for wireless communication, the code comprising instructions executable by a processor to perform a method of any of aspects 26 through 30.

Aspect 43: A method for wireless communication, comprising: receiving, at a first wireless device, situational information for a second wireless device over a first communication link between the first wireless device and the second wireless device, wherein the situational information indicates position, velocity, direction, or a combination thereof; receiving, at the first wireless device, situational information for a third wireless device over a second communication link between the first wireless device and the third wireless device; determining that the second wireless device and the third wireless device have a collision likelihood above a threshold based at least in part on the situational information for the second and third wireless devices; and transmitting a message comprising collision avoidance information to the second wireless device on behalf of the third wireless device and based at least in part on determining that the second wireless and the third wireless device have a collision likelihood above the threshold.

Aspect 44: The method of aspect 43, further comprising: determining a behavior associated with position, velocity, direction, or a combination thereof that will prevent collision between the second and third wireless devices, wherein the collision avoidance information comprises an indication of the behavior.

Aspect 45: The method of aspects 43 or 44, further comprising: determining a direction for the second wireless device to avoid for a duration of time, wherein the collision avoidance information comprises an indication of the direction and the duration of time.

Aspect 46: The method of any of aspects 43 to 45, further comprising: determining an adjustment to a velocity of the second wireless device, wherein the collision avoidance information comprises an indication of the adjustment.

Aspect 47: The method of any of aspects 43 to 46, further comprising: determining an adjustment to a heading angle of the second wireless device, wherein the collision avoidance information comprises an indication of the adjustment.

Aspect 48: The method of aspect 44, further comprising: transmitting an indication of the behavior to the third wireless device.

Aspect 49: The method of any of aspects 43 to 48, further comprising: determining a route for the second wireless device to take to prevent a collision with the third wireless device based at least in part on the situational information for the second and third wireless devices, wherein the collision avoidance information comprises an indication of the route.

Aspect 50: The method of any of aspects 43 to 49, further comprising: determining a route of the third wireless device based at least in part on the situational information for the third wireless device, wherein the collision avoidance information comprises an indication of the route.

Aspect 51: The method of any of aspects 43 to 50, further comprising: determining a period of time during which the collision avoidance information is applicable, wherein the collision avoidance information includes an indication of the period of time.

Aspect 52: The method of any of aspects 43 to 51, further comprising: monitoring the second wireless device using at least one sensor coupled with the first wireless device, wherein determining that the second wireless and the third wireless device have a collision likelihood above the threshold is based at least in part on the monitoring.

Aspect 53: The method of aspect 51, further comprising: transmitting a second message comprising collision avoidance information to the third wireless device based at least in part on determining that the second wireless and the third wireless device have a collision likelihood above the threshold.

Aspect 54: The method of any of aspects 43 to 53, wherein the collision avoidance information comprises an indication of a direction for the third wireless device to avoid, a duration of time for the direction to be avoided, an adjustment to a velocity of the third wireless device, an adjustment to a heading angle of the third wireless device, situational information for the second wireless device, or a combination thereof.

Aspect 55: The method of any of aspects 43 to 54, further comprising: determining an identifier of the second wireless device; and transmitting an indication of the identifier to the third wireless device.

Aspect 56: The method of any of aspects 43 to 55, further comprising: receiving from the second wireless device an indication of a period of time the second wireless device is able to receive communications; and transmitting the collision avoidance information to the second wireless device during the period of time.

Aspect 57: The method of any of aspects 43 to 56, further comprising: determining that the second wireless device is unaware of the third wireless device, wherein the collision avoidance information is transmitted based at least in part on determining that the second wireless device is unaware of the third wireless device.

Aspect 58: The method of any of aspects 43 to 57, further comprising: determining that the second wireless device is out of communication range with the third wireless device.

Aspect 59: The method of any of aspects 43 to 58, further comprising: determining that the first wireless device is on a collision-free course with respect to the second wireless device, wherein the collision avoidance information is transmitted after determining that the first wireless device is on the collision-free course.

Aspect 60: The method of any of aspects 43 to 59, wherein the first wireless device and the second wireless device are moving asynchronously or have a difference in velocity greater than a threshold.

Aspect 61: An apparatus for wireless communications comprising a processor; and memory coupled to the processor, the processor and memory configured to perform a method of any of aspects 43 to 60.

Aspect 62: An apparatus, comprising at least one means for performing the method of any of aspects 43 to 60.

Aspect 63: A non-transitory computer-readable medium storing code for wireless communications, the code comprising instructions executable by a processor to perform a method of any of aspects 43 to 60.

Aspect 64: A method for wireless communication, comprising: transmitting, by a first wireless device, situational information for the first wireless device to a second wireless device over a communication link between the first wireless device and the second wireless device, wherein the situational information indicates position, velocity, direction, or a combination thereof receiving, from the second wireless device over the communication link, a message comprising collision avoidance information that indicates the second wireless device and a third wireless device have a collision likelihood above a threshold; and outputting a signal to prompt a change in position, velocity, direction, or a combination thereof based at least in part on the collision avoidance information.

Aspect 65: The method of aspect 64, wherein the collision avoidance information comprises a direction for the first wireless device to avoid for a duration of time, an adjustment to a heading angle of the second wireless device, an adjustment to a velocity of the second wireless device, situational information for the third wireless device, or a combination thereof.

Aspect 66: The method of any of aspects 64 or 65, wherein the signal comprises a visual, auditory, or tactile signal detectable by a human.

Aspect 67: The method of any of aspects 64 or 65, wherein the signal comprises an electrical signal detectable by an electronic device.

Aspect 68: The method of any of aspects 64 to 67, further comprising: determining that a fourth wireless device within a threshold distance of the first wireless device is traveling in a same direction or to a same destination as the first wireless device; and transmitting the collision avoidance information to the fourth wireless device.

Aspect 69: The method of any of aspects 64 to 68, further comprising: receiving from the second wireless device an indication of an identifier of the third wireless device; and communicating with the third wireless device about the collision likelihood based at least in part on the identifier.

Aspect 70: The method of aspect 69, wherein the collision avoidance information and the indication of the identifier are received while the first wireless device is out of communication range with the third wireless device, the method further comprising: determining that the first wireless device is in communication range of the third wireless device, wherein communicating with the third wireless device is based at least in part on determining that the first wireless device is in communication range of the third wireless device.

Aspect 71: An apparatus for wireless communication, comprising a processor; and memory coupled to the processor, the processor and memory configured to perform a method of any of aspects 64 to 70.

Aspect 72: An apparatus, comprising at least one means for performing the method of any of aspects 64 to 70.

Aspect 73: A non-transitory computer-readable medium storing code for wireless communications, the code comprising instructions executable by a processor to perform a method of any of aspects 64 to 70.

Aspect 74: A method for wireless communication, comprising: receiving, at a first wireless device, situational information for a second wireless device from a third wireless device, wherein the situational information indicates position, velocity, direction, or a combination thereof; determining a route of the second wireless device based at least in part on the situational information for the second wireless device; determining that the first wireless device and the second wireless device have a collision likelihood above a threshold based at least in part on the route of the second wireless device; and transmitting a message comprising collision avoidance information to the second wireless device based at least in part on determining that the first wireless and the second wireless device have a collision likelihood above the threshold.

Aspect 75: The method of aspect 74, further comprising: determining additional situational information for the second wireless device based at least in part on information from one or more sensors coupled with the first wireless device, wherein the collision likelihood is determined based at least in part on the additional situational information for the second wireless device.

Aspect 76: The method of aspect 75, further comprising: transmitting the additional situational information for the second wireless device to the third wireless device, wherein the route of the second wireless device is determined cooperatively with the third wireless device.

Aspect 77: The method of any of aspects 74 to 76, further comprising: receiving additional situational information for the second wireless device from the second wireless device, wherein route of the second wireless device is determined based at least in part on the additional situational information for the second wireless device.

Aspect 78: The method of any of aspects 74 to 77, wherein the situational information comprises a location of the second wireless device within an image frame, one or more coordinates of the second wireless device, a heading angle of the second wireless device, a body position of a user of the second wireless device, or a combination thereof.

Aspect 79: An apparatus for wireless communication, comprising a processor; and memory coupled to the processor, the processor and memory configured to perform a method of any of aspects 74 to 78.

Aspect 80: An apparatus, comprising at least one means for performing the method of any of aspects 74 to 78.

Aspect 81: A non-transitory computer-readable medium storing code for wireless communications, the code comprising instructions executable by a processor to perform a method of any of aspects 74 to 78.

Techniques described herein may be used for various wireless communications systems such as CDMA, TDMA, FDMA, OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication, comprising:
   receiving, at a first wireless device, situational information for a second wireless device over a first communication link between the first wireless device and the second wireless device and situational information for a third wireless device over a second communication link between the first wireless device and the third wireless device;
   receiving from the second wireless device an indication of a period of time the second wireless device is able to receive communications; and
   transmitting, during the period of time, a message comprising guidance information to the second wireless device on behalf of the third wireless device and based at least in part on the second wireless device and the third wireless device having an event likelihood above a threshold, wherein the event likelihood is based at least in part on the situational information for the second wireless device and the situational information for the third wireless device.

2. The method of claim 1, wherein the situational information indicates a yaw, a pitch, a roll angle, a position, a velocity, a direction, an acceleration, a change in yaw, a change in roll angle, a change in position, a change in velocity, a change in direction, a change in acceleration, or a combination thereof.

3. The method of claim 1, wherein the event likelihood comprises an impact likelihood.

4. The method of claim 1, wherein the guidance information comprises an indication of a possible impact, an indication of an action to avoid a possible impact, or a combination thereof.

5. The method of claim 1, further comprising:
   determining a direction for the second wireless device to avoid for a duration of time, wherein the guidance information comprises an indication of the direction and the duration of time;
   determining an adjustment to a velocity of the second wireless device, wherein the guidance information comprises an indication of the adjustment; or
   determining an adjustment to a heading angle of the second wireless device, wherein the guidance information comprises an indication of the adjustment.

6. The method of claim 1, further comprising:
   determining a route for the second wireless device to take to prevent an impact with the third wireless device based at least in part on the situational information for the second wireless device and the third wireless device, wherein the guidance information comprises an indication of the route.

7. The method of claim 1, further comprising:
   determining a route of the third wireless device based at least in part on the situational information for the third wireless device, wherein the guidance information comprises an indication of the route.

8. The method of claim 1, further comprising:
   transmitting a second message comprising different guidance information to the third wireless device based at least in part on determining that the second wireless device and the third wireless device have the event likelihood above the threshold.

9. The method of claim 1, further comprising:
   determining that the second wireless device is unaware of the third wireless device, wherein the guidance information is transmitted based at least in part on determining that the second wireless device is unaware of the third wireless device.

10. The method of claim 1, further comprising:
    determining that the first wireless device is on an impact-free course with respect to the second wireless device, wherein the guidance information is transmitted after determining that the first wireless device is on the impact-free course.

11. The method of claim 1, wherein the first wireless device and the second wireless device are moving asynchronously or have a difference in velocity greater than a threshold velocity.

12. A method for wireless communication, comprising:
    transmitting, by a first wireless device, situational information for the first wireless device to a second wireless device over a communication link between the first wireless device and the second wireless device;
    receiving, from the second wireless device over the communication link, a message comprising guidance information that indicates the first wireless device and a third wireless device have an event likelihood above a threshold, wherein the guidance information is received while the first wireless device is out of communication range with the third wireless device;
    outputting a signal to prompt a change in behavior based at least in part on the guidance information;
    determining that the first wireless device is in communication range of the third wireless device; and
    communicating with the third wireless device based at least in part on determining that the first wireless device is in communication range of the third wireless device.

13. The method of claim 12, wherein the situational information indicates a yaw, a pitch, a roll angle, a position, a velocity, a direction, an acceleration, a change in yaw, a change in roll angle, a change in position, a change in velocity, a change in direction, a change in acceleration, or a combination thereof.

14. The method of claim 12, wherein the change in behavior comprises a change in yaw, a change in pitch, a change in roll angle, a change in velocity, a change in direction, a change in acceleration, outputting an alert signal, or a combination thereof.

15. The method of claim 12, wherein the signal is communicated to a vehicle coupled with the first wireless device, a person coupled with the first wireless device, the second wireless device, the third wireless device, or a combination thereof, and wherein the change in behavior comprises a change by the vehicle coupled with the first wireless device, a change by the person coupled with the first wireless device, a change by the second wireless device, a change by the third wireless device, or a combination thereof.

16. The method of claim 12, wherein the guidance information comprises a direction for the first wireless device to avoid for a duration of time, an adjustment to a heading angle of the second wireless device, an adjustment to a velocity of the second wireless device, situational information for the third wireless device, or a combination thereof.

17. The method of claim 12, wherein the signal comprises a visual, auditory, or tactile signal detectable by a human or an electrical signal detectable by an electronic device.

18. The method of claim 12, further comprising:
determining that a fourth wireless device within a threshold distance of the first wireless device is traveling in a same direction or to a same destination as the first wireless device; and
transmitting the guidance information to the fourth wireless device.

19. A method for wireless communication, comprising:
receiving, at a first wireless device, situational information for a second wireless device from a third wireless device; and
transmitting, to the second wireless device based at least in part on the situational information for the second wireless device received from the third wireless device, a message comprising guidance information to prevent an event between the first wireless device and the second wireless device based at least in part on the first wireless device and the second wireless device having an event likelihood above a threshold, wherein the event likelihood is based at least in part on a route of the second wireless device, and wherein the route of the second wireless device is based at least in part on the situational information for the second wireless device.

20. The method of claim 19, further comprising:
determining additional situational information for the second wireless device based at least in part on information from one or more sensors coupled with the first wireless device, wherein the event likelihood is determined based at least in part on the additional situational information for the second wireless device.

21. The method of claim 20, further comprising:
transmitting the additional situational information for the second wireless device to the third wireless device, wherein the route of the second wireless device is determined cooperatively with the third wireless device.

22. The method of claim 19, further comprising:
receiving additional situational information for the second wireless device from the second wireless device, wherein the route of the second wireless device is determined based at least in part on the additional situational information for the second wireless device.

23. The method of claim 19, wherein the situational information comprises a location of the second wireless device within an image frame, one or more coordinates of the second wireless device, a heading angle of the second wireless device, a body position of a user of the second wireless device, or a combination thereof.

24. A method for wireless communication, comprising:
receiving, at a first wireless device, surroundings information from a second wireless device over a link between the first wireless device and the second wireless device;
receiving from a third wireless device an indication of a period of time the third wireless device is able to receive communications; and
transmitting, to the third wireless device during the period of time, a message comprising guidance information to the third wireless device based at least in part on the third wireless device having an event likelihood above a threshold, wherein the event likelihood is based at least in part on the surroundings information from the second wireless device.

25. The method of claim 24, wherein the surroundings information indicates an object, a road condition, or a combination thereof.

26. The method claim 24, wherein the event likelihood comprises a likelihood that the second wireless device passes within a threshold distance of an object or road condition.

27. The method of claim 24, wherein the guidance information indicates a location of an object, a location of a road condition, or a combination thereof.

28. The method of claim 24, wherein the guidance information indicates one or more actions the second wireless device can take to reduce the event likelihood.

29. The method of claim 19, further comprising:
receiving from the second wireless device an indication of a period of time the second wireless device is able to receive communications, wherein the message is received during the period of time.

30. The method of claim 19, further comprising:
determining that the second wireless device has come into communication range, wherein the message is transmitted based at least in part on determining that the second wireless device has come into communication range.

31. An apparatus for wireless communication, comprising:
a processor; and
memory coupled with the processor, the processor configured to:
receive, at a first wireless device, situational information for a second wireless device over a first communication link between the first wireless device and the second wireless device and situational information for a third wireless device over a second communication link between the first wireless device and the third wireless device;
receive from the second wireless device an indication of a period of time the second wireless device is able to receive communications; and
transmit, during the period of time, a message comprising guidance information to the second wireless device on behalf of the third wireless device and based at least in part on the second wireless device and the third wireless device having an event likelihood above a threshold, wherein the event likelihood is based at least in part on the situational information for the second wireless device and the situational information for the third wireless device.

32. The apparatus of claim 31, wherein the processor is further configured to:
determine that the second wireless device is unaware of the third wireless device, wherein the guidance information is transmitted based at least in part on the determination that the second wireless device is unaware of the third wireless device.

33. The apparatus of claim 31, wherein the processor is further configured to:
determine that the first wireless device is on an impact-free course with respect to the second wireless device, wherein the guidance information is transmitted after the determination that the first wireless device is on the impact-free course.

34. An apparatus for wireless communication, comprising:
a processor; and
memory coupled with the processor, the processor configured to:
transmit, by a first wireless device, situational information for the first wireless device to a second wireless device over a communication link between the first wireless device and the second wireless device;
receive, from the second wireless device over the communication link, a message comprising guidance information that indicates the first wireless device and a third wireless device have an event likelihood above a threshold, wherein the guidance information is received while the first wireless device is out of communication range with the third wireless device;
output a signal to prompt a change in behavior based at least in part on the guidance information;
determine that the first wireless device is in communication range of the third wireless device; and
communicate with the third wireless device based at least in part on the determination that the first wireless device is in communication range of the third wireless device.

35. The apparatus of claim 34, wherein the processor is further configured to:
transmit to the second wireless device an indication of a period of time the first wireless device is able to receive communications, wherein the message is received during the period of time.

36. The apparatus of claim 34, wherein the processor is further configured to:
determine that a fourth wireless device within a threshold distance of the first wireless device is traveling in a same direction or to a same destination as the first wireless device; and
transmit the guidance information to the fourth wireless device.

37. An apparatus for wireless communication, comprising:
a processor; and
memory coupled with the processor, the processor configured to:
receive, at a first wireless device, situational information for a second wireless device from a third wireless device; and
transmit, to the second wireless device based at least in part on the situational information for the second wireless device received from the third wireless device, a message comprising guidance information to prevent an event between the first wireless device and the second wireless device based at least in part on the first wireless device and the second wireless device having an event likelihood above a threshold, wherein the event likelihood is based at least in part on a route of the second wireless device, and wherein the route of the second wireless device is based at least in part on the situational information for the second wireless device.

38. The apparatus of claim 37, wherein the processor is further configured to:
receive from the second wireless device an indication of a period of time the second wireless device is able to receive communications, wherein the message is received during the period of time.

39. The apparatus of claim 37, wherein the processor is further configured to:
determine that the second wireless device has come into communication range, wherein the message is transmitted based at least in part on the determination that the second wireless device has come into communication range.

40. An apparatus for wireless communication, comprising:
a processor; and
memory coupled with the processor, the processor configured to:
receive, at a first wireless device, surroundings information from a second wireless device over a link between the first wireless device and the second wireless device;
receive from a third wireless device an indication of a period of time the third wireless device is able to receive communications; and
transmit, to the third wireless device during the period of time, a message comprising guidance information to the third wireless device based at least in part on the third wireless device having an event likelihood above a threshold, wherein the event likelihood is based at least in part on the surroundings information from the second wireless device.

41. The apparatus of claim 40, wherein the processor is further configured to:
determine that the first wireless device is on an impact-free course with respect to the third wireless device, wherein the message is transmitted after the determination that the first wireless device is on the impact-free course.

42. The apparatus of claim 40, wherein the processor is further configured to:
determine that the third wireless device has come into communication range, wherein the message is transmitted based at least in part on the determination that the third wireless device has come into communication range.

43. A non-transitory computer-readable medium storing code for wireless communication, the code comprising instructions executable by a processor to:
receive, at a first wireless device, situational information for a second wireless device over a first communication link between the first wireless device and the second wireless device and situational information for a third wireless device over a second communication link between the first wireless device and the third wireless device;

receive from the second wireless device an indication of a period of time the second wireless device is able to receive communications; and transmit, during the period of time, a message comprising guidance information to the second wireless device on behalf of the third wireless device and based at least in part on the second wireless device and the third wireless device having an event likelihood above a threshold, wherein the event likelihood is based at least in part on the situational information for the second wireless device and the situational information for the third wireless device.

44. The non-transitory computer-readable medium of claim 43, wherein the instructions are further executable by the processor to:

determine that the second wireless device is unaware of the third wireless device, wherein the guidance information is transmitted based at least in part on the determination that the second wireless device is unaware of the third wireless device.

45. The non-transitory computer-readable medium of claim 43, wherein the instructions are further executable by the processor to:

determine that the first wireless device is on an impact-free course with respect to the second wireless device, wherein the guidance information is transmitted after the determination that the first wireless device is on the impact-free course.

46. A non-transitory computer-readable medium storing code for wireless communication, the code comprising instructions executable by a processor to:

transmit, by a first wireless device, situational information for the first wireless device to a second wireless device over a communication link between the first wireless device and the second wireless device;

receive, from the second wireless device over the communication link, a message comprising guidance information that indicates the first wireless device and a third wireless device have an event likelihood above a threshold, wherein the guidance information is received while the first wireless device is out of communication range with the third wireless device;

output a signal to prompt a change in behavior based at least in part on the guidance information;

determine that the first wireless device is in communication range of the third wireless device; and communicate with the third wireless device based at least in part on the determination that the first wireless device is in communication range of the third wireless device.

47. The non-transitory computer-readable medium of claim 46, wherein the instructions are further executable by the processor to:

transmit to the second wireless device an indication of a period of time the first wireless device is able to receive communications, wherein the message is received during the period of time.

48. The non-transitory computer-readable medium of claim 46, wherein the instructions are further executable by the processor to:

determine that a fourth wireless device within a threshold distance of the first wireless device is traveling in a same direction or to a same destination as the first wireless device; and transmit the guidance information to the fourth wireless device.

49. A non-transitory computer-readable medium storing code for wireless communication, the code comprising instructions executable by a processor to:

receive, at a first wireless device, situational information for a second wireless device from a third wireless device; and transmit, to the second wireless device based at least in part on the situational information for the second wireless device received from the third wireless device, a message comprising guidance information to prevent an event between the first wireless device and the second wireless device based at least in part on the first wireless device and the second wireless device having an event likelihood above a threshold, wherein the event likelihood is based at least in part on a route of the second wireless device, and wherein the route of the second wireless device is based at least in part on the situational information for the second wireless device.

50. The non-transitory computer-readable medium of claim 49, wherein the instructions are further executable by the processor to:

receive from the second wireless device an indication of a period of time the second wireless device is able to receive communications, wherein the message is received during the period of time.

51. The non-transitory computer-readable medium of claim 49, wherein the instructions are further executable by the processor to:

determine that the second wireless device has come into communication range, wherein the message is transmitted based at least in part on the determination that the second wireless device has come into communication range.

52. A non-transitory computer-readable medium storing code for wireless communication, the code comprising instructions executable by a processor to:

receive, at a first wireless device, surroundings information from a second wireless device over a link between the first wireless device and the second wireless device;

receive from a third wireless device an indication of a period of time the third wireless device is able to receive communications; and transmit, to the third wireless device during the period of time, a message comprising guidance information to the third wireless device based at least in part on the third wireless device having an event likelihood above a threshold, wherein the event likelihood is based at least in part on the surroundings information from the second wireless device.

53. The non-transitory computer-readable medium of claim 52, wherein the instructions are further executable by the processor to:

determine that the first wireless device is on an impact-free course with respect to the third wireless device, wherein the message is transmitted after the determination that the first wireless device is on the impact-free course.

54. The non-transitory computer-readable medium of claim 52, wherein the instructions are further executable by the processor to:

determine that the third wireless device has come into communication range, wherein the message is transmitted based at least in part on the determination that the third wireless device has come into communication range.

55. An apparatus for wireless communication, comprising:
- means for receiving, at a first wireless device, situational information for a second wireless device over a first communication link between the first wireless device and the second wireless device and situational information for a third wireless device over a second communication link between the first wireless device and the third wireless device;
- means for receiving from the second wireless device an indication of a period of time the second wireless device is able to receive communications; and
- means for transmitting, during the period of time, a message comprising guidance information to the second wireless device on behalf of the third wireless device and based at least in part on the second wireless device and the third wireless device having an event likelihood above a threshold, wherein the event likelihood is based at least in part on the situational information for the second wireless device and the situational information for the third wireless device.

56. An apparatus for wireless communication, comprising:
- means for transmitting, by a first wireless device, situational information for the first wireless device to a second wireless device over a communication link between the first wireless device and the second wireless device;
- means for receiving, from the second wireless device over the communication link, a message comprising guidance information that indicates the first wireless device and a third wireless device have an event likelihood above a threshold, wherein the guidance information is received while the first wireless device is out of communication range with the third wireless device;
- means for outputting a signal to prompt a change in behavior based at least in part on the guidance information;
- means for determining that the first wireless device is in communication range of the third wireless device; and
- means for communicating with the third wireless device based at least in part on determining that the first wireless device is in communication range of the third wireless device.

57. An apparatus for wireless communication, comprising:
- means for receiving, at a first wireless device, situational information for a second wireless device from a third wireless device; and
- means for transmitting, to the second wireless device based at least in part on the situational information for the second wireless device received from the third wireless device, a message comprising guidance information to prevent an event between the first wireless device and the second wireless device based at least in part on the first wireless device and the second wireless device having an event likelihood above a threshold, wherein the event likelihood is based at least in part on a route of the second wireless device, and wherein the route of the second wireless device is based at least in part on the situational information for the second wireless device.

58. An apparatus for wireless communication, comprising:
- means for receiving, at a first wireless device, surroundings information from a second wireless device over a link between the first wireless device and the second wireless device;
- means for receiving from a third wireless device an indication of a period of time the third wireless device is able to receive communications; and
- means for transmitting, to the third wireless device during the period of time, a message comprising guidance information to the third wireless device based at least in part on the third wireless device having an event likelihood above a threshold, wherein the event likelihood is based at least in part on the surroundings information from the second wireless device.

* * * * *